United States Patent
Van Oort et al.

(10) Patent No.: US 10,616,347 B1
(45) Date of Patent: Apr. 7, 2020

(54) DEVICES, SYSTEMS AND METHODS FOR INTERNET AND FAILOVER CONNECTIVITY AND MONITORING

(71) Applicant: R & D Industries, Inc., Milford, IA (US)

(72) Inventors: Christopher Van Oort, Ames, IA (US); Donald J Van Oort, West Okoboji, IA (US); Nathan Lafferty, Ames, IA (US)

(73) Assignee: R&D Industries, Inc., Milford, IA (US)

( * ) Notice: Subject to any disclaimer, the term of this patent is extended or adjusted under 35 U.S.C. 154(b) by 151 days.

(21) Appl. No.: 15/789,554

(22) Filed: Oct. 20, 2017

Related U.S. Application Data

(60) Provisional application No. 62/410,702, filed on Oct. 20, 2016.

(51) Int. Cl.
| | | |
|---|---|---|
| *G06F 15/173* | (2006.01) | |
| *G06F 15/16* | (2006.01) | |
| *H04L 29/08* | (2006.01) | |
| *H04L 12/66* | (2006.01) | |
| *H04L 12/813* | (2013.01) | |
| *H04L 12/26* | (2006.01) | |
| *H04L 12/28* | (2006.01) | |

(52) U.S. Cl.
CPC .............. *H04L 67/14* (2013.01); *H04L 12/28* (2013.01); *H04L 12/66* (2013.01); *H04L 43/0876* (2013.01); *H04L 47/20* (2013.01)

(58) Field of Classification Search
CPC ......... H04L 67/14; H04L 12/28; H04L 12/66; H04L 43/0876; H04L 47/20
USPC ......................................................... 709/224
See application file for complete search history.

(56) References Cited

U.S. PATENT DOCUMENTS

| | | | | |
|---|---|---|---|---|
| 8,238,253 | B2* | 8/2012 | Morrill | H04L 41/5009 370/241 |
| 8,717,911 | B2* | 5/2014 | Bugenhagen | H04L 12/14 370/252 |
| 9,317,380 | B2* | 4/2016 | Mahindru | G06F 11/2023 |
| 9,489,270 | B2* | 11/2016 | Anglin | G06F 11/1458 |
| 9,535,805 | B2* | 1/2017 | Ananthanarayanan | G06F 11/2033 |
| 9,588,853 | B2* | 3/2017 | Harper | G06F 11/2033 |
| 9,632,887 | B2* | 4/2017 | Joshi | G06F 11/2041 |
| 9,703,619 | B2* | 7/2017 | Andre | G06F 11/008 |
| 9,755,889 | B2* | 9/2017 | Griswold | H04L 41/069 |
| 9,787,522 | B1* | 10/2017 | Contreras | H04L 67/1097 |
| 9,852,035 | B2* | 12/2017 | Harper | G06F 11/2033 |
| 10,135,692 | B2* | 11/2018 | Purushotham | H04L 41/12 |
| 10,169,173 | B2* | 1/2019 | Deng | G06F 11/2007 |
| 10,255,061 | B2* | 4/2019 | Lander | G06F 11/3688 |
| 10,275,328 | B2* | 4/2019 | Antony | G06F 11/203 |
| 2017/0052707 | A1* | 2/2017 | Koppolu | G06F 9/5061 |
| 2018/0095855 | A1* | 4/2018 | Sanakkayala | G06F 9/45558 |

\* cited by examiner

*Primary Examiner* — Melvin H Pollack
(74) *Attorney, Agent, or Firm* — Davis, Brown, Koehn, Shors & Roberts, P.C.

(57) ABSTRACT

The disclosed apparatus, systems and methods relate a failover and internet connection monitoring system.

19 Claims, 33 Drawing Sheets

⊗ Oregon Probe went offline  Resolved ✓
an hour ago

⊗ Smith Store #992 went offline  Resolved ✓
an hour ago

Data Usage Overview

Current Cycle Total Data Usage:

[ 0.15 / 2 GB (7.36%) ]

Current Cycle Average Data Usage:

[ 0.07 / 1 GB (7.36%) ]

Organization Overview    ↻

⊞ All   | Search

Show: ✓ All  ○ Issues    Refresh Automatically ☐

✓  +  ⛬ Smith's Local Store
✓  −  ⛬ International Restaurants
   ✓  +  ⚲ IR North Plains
   ⚙  +  ⚲ IR Chicago
   ✓  +  ⚲ IR New York
   ✓  −  ⚲ Northern US
      ✓  −  ⚲ Minnesota
         ✓  +  ▭ Duluth Probe

FIG. 5C

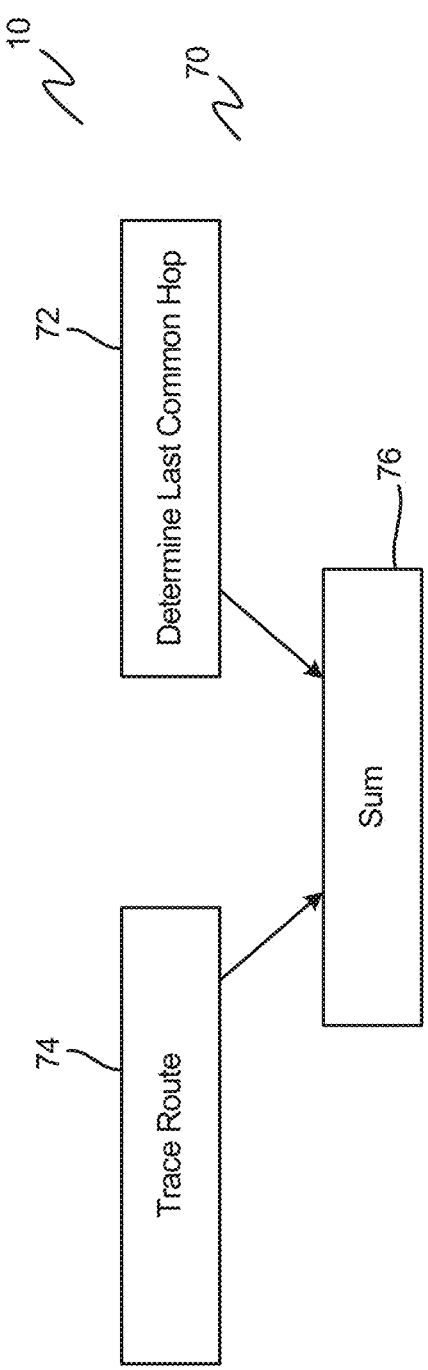

| Ping Time (RTT) per hop | | | | | Packet Loss per hop | | | | | Date | Time | Total (RTT) Latency of first five hops in milliseconds | Packet Loss % of first five hops in milliseconds |
|---|---|---|---|---|---|---|---|---|---|---|---|---|---|
| hop-1 | hop-2 | hop-3 | hop-4 | hop-5 | hop-1 | hop-2 | hop-3 | hop-4 | hop-5 | | | | |
| 1 | 3 | 0 | 0 | 1 | 0% | 0% | 0% | 0% | 0% | 8/3/2017 | 10:52 | 5 | 0% |
| 1 | 48 | 0 | 0 | 1 | 0% | 1% | 0% | 0% | 0% | 8/3/2017 | 10:53 | 50 | 1% |
| 1 | 248 | 0 | 0 | 1 | 0% | 3% | 0% | 0% | 0% | 8/3/2017 | 10:54 | 250 | 3% |
| 1 | 248 | 0 | 0 | 1 | 0% | 3% | 0% | 0% | 0% | 8/3/2017 | 10:55 | 250 | 3% |
| 1 | 248 | 0 | 0 | 1 | 0% | 3% | 0% | 0% | 0% | 8/3/2017 | 10:56 | 250 | 3% |
| 1 | 1498 | 0 | 0 | 1 | 0% | 58% | 0% | 0% | 0% | 8/3/2017 | 10:57 | 1500 | 58% |
| 1 | 1510 | 0 | 0 | 1 | 0% | 62% | 0% | 0% | 0% | 8/3/2017 | 10:58 | 1512 | 62% |
| 1 | 1523 | 0 | 0 | 1 | 0% | 65% | 0% | 0% | 0% | 8/3/2017 | 10:59 | 1525 | 65% |
| 1 | 748 | 0 | 0 | 1 | 0% | 22% | 0% | 0% | 0% | 8/3/2017 | 11:00 | 750 | 22% |
| 1 | 3 | 0 | 0 | 1 | 0% | 0% | 0% | 0% | 0% | 8/3/2017 | 11:01 | 5 | 0% |
| 1 | 3 | 0 | 0 | 1 | 0% | 0% | 0% | 0% | 0% | 8/3/2017 | 11:02 | 5 | 0% |
| 1 | 3 | 0 | 0 | 1 | 0% | 0% | 0% | 0% | 0% | 8/3/2017 | 11:03 | 5 | 0% |

This data is on the probe only and isn't forward to Connection Monitor | Data sent from probe to Connection Monitor

FIG. 11A

DEVICES, SYSTEMS AND METHODS FOR INTERNET AND FAILOVER CONNECTIVITY AND MONITORING

CROSS-REFERENCE TO RELATED APPLICATION(S)

This application claims priority to the U.S. Provisional Application No. 62/410,702 filed Oct. 20, 2016 and entitled "Devices, Systems and Methods for Internet and Failover Connectivity and Monitoring" which is hereby incorporated by reference in its entirety under 35 U.S.C. § 119(e).

TECHNICAL FIELD

The disclosed technology relates generally to various devices, systems and methods for monitoring and providing internet connectivity, and in particular, to the devices, methods, and design principles allowing for maintaining and monitoring uninterrupted internet connectivity. This has implications in a wide array of applications, such as in commercial, retail, industrial, residential, banking and other settings.

BACKGROUND

The disclosure relates to apparatus, systems and methods for maintaining a consistent internet connection despite, for example, an interruption to a direct hardwire connection.

Traditionally, firewalls make a determination of the connection state of each network connection via monitoring an upstream device. Prior art monitoring techniques include various known protocols, such as ICMP or other TCP-based protocols including but not limited to DNS, HTTP or HTTPS to validate a connection by monitoring network traffic via a primary connection to see if the traffic is "reaching" a monitored host and inducing a networked response. Under these approaches, when the monitored upstream host fails to respond, the firewall can "failover" the connection to a secondary (or "failover") internet connection.

Once failed over, outbound and inbound internet traffic is routed via the secondary, or failover internet connection. Ideally, when these upstream monitoring approaches are occurring over the primary internet connection to re-validate the connection, such as by reaching an upstream monitored host, the firewall should switch, or "failback" to the primary connection. The system can tell the firewall what to do using server-side logic or in various implementations the system can utilize state machine logic, artificial intelligence or machine learning. However, there are multiple modes of failure which can result in false positives or negatives in the connection validation and/or disrupt these approaches or prevent proper failover/failback switching.

Failures can occur or otherwise be triggered for any number of reasons. For example, where: a defect or failure in the structure or function of any given network layer can result in false validation results; the firewall incorrectly marks a connected (UP) internet connection as down/failed; the firewall fails to detect a disconnected (DOWN) internet connection and does not properly failover to the backup connection; the firewall fails over to a backup connection and fails to switch connections back to the primary connection upon failing back to the primary connection; intermittent problems can also occur due to a myriad of additional disruptions, such as network link saturation, DNS failures or mis-configurations, or Border Gateway Protocol ("BGP") router mis-configurations and others, each of which can also cause a firewall or other devices such as but not limited to a router or failover network appliance, to incorrectly identify and validate the connection state. The prior art does not contain a solution for overcoming intermittent network downtime to ensure network and thus business continuity or when a primary connection is stable to switch back to a primary connection.

Prior art firewalls or router implementations typically test internet connectivity through ICMP or HTTP/S but in the case of an HTTP/S failure, routing failures, or cloud-host blocking (dropping traffic), traditional network monitoring can generate false positives and incorrectly trigger firewalls to switch to more expensive/data capped internet connectivity.

Because the present system operates cloud-based connection validation, the system is able to "look down" to the client to try and best determine if the connection is actually up or down. In various implementations, if the cloud server is receiving traffic destined for one IP address, sub-domain on another sub-domain, the system is able to determine that the connection associated with each sub-domain is valid. In traditional networking monitoring, users at a site might know a connection is down or possibly failed over, but centralized or outsourced IT managers may not know for minutes or hours or even until staff or angry end users call to alert them. WAN bonding can work as a second layer of connection validation for purposes of resolution. It is understood that in certain implementations, connection validation can also be applied to WAN bonded connections to validate both or either connection is operating as desired, for purposes of issue resolution and/or remediation.

BRIEF SUMMARY

Discussed herein are various devices, systems and methods relating to providing and monitoring internet connections. More particularly, the disclosed embodiments relate to certain internet connection devices and to systems and methods for monitoring the connectivity and more particularly, the route of connection to the internet, route changes and network congestion. In various implementations, a cloud-based monitoring system is provided, wherein the system enforces policy routing to validate various internet connections. In these and other implementations, the system also provides for routed packet delivery to validate each connection. In various implementations, the disclosed policy routing can be implemented by way of a firewall or failover appliance to route dispatch tagged packets through specified gateways to validate and monitor internet connectivity at a cloud-based server.

In certain of these implementations, a local probe can be used to send targeted packets via the various connections for cloud-based monitoring, validation and alerts wherein the local probe can be a dedicated hardware device or software running on a server, network access controller, or other network connected device. In further implementations, targeted packets can be dispatched from a router, firewall or other networked component configured to dispatch such packets to the cloud for resolution and connection validation.

In certain implementations, the local probe can be configured for testing multiple ports and protocols and other various methods for testing internet connectivity and stability to then subsequently control failover in a firewall/router on a local network, that is without the use of a non-local connection to the cloud.

By implementing an algorithm and traffic correlation on the cloud, the actual state of the failover appliance can be evaluated. That is, in certain implementations, packets can be specifically routed through various network traffic paths to be correspondingly resolved or received at distinct cloud locations, such that a packet received at a first cloud address will validate a first connection, a packet received at a second cloud address will validate a second connection and so on. By properly validating connection information, the present system can help both regular users through "common language alerts" and IT administrators to track down both false positives, actual network issues, and complex upstream networking issues such as but not limited to, DNS misconfigurations, BGP route issues, net neutrality, censorship or other blocking issues that would be understood by one of skill in the art.

In one Example, various implementations provide a system of one or more computers that can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions such as via local probe hardware, desktop, server client, phone app or other software or hardware running software that can be used to perform connection validation. One general aspect includes a failover connection monitoring system, including: a cloud server, a probe device configured to issue routed packets and a policy routing enforcement system configured to route the routed packets to the cloud server for gateway resolution. Other embodiments of this aspect include corresponding computer systems, apparatus, and computer programs recorded on one or more computer storage devices, each configured to perform the actions of the methods.

Various implementations of this Example may include one or more of the following features. The failover connection monitoring system further including a scalable platform adapted to gather performance and congestion data on multiple internet connections simultaneously. The failover connection monitoring system further including a validation system, where the validation system is configured to provide connection validation for backup internet connections while they are otherwise dormant to primary internet traffic flows. The failover connection monitoring system further including a secure system capable of making backup internet connection validations out-of-band. The failover connection monitoring system further including an independent network. in these embodiments, the failover connection monitoring system can be configured for utilizing machine learning, artificial intelligence, and/or state-machine logic. The failover connection monitoring system wherein adjacency matrices are utilized for data storage. Implementations of the described techniques may include hardware, a method or process, or computer software on a computer-accessible medium.

In some implementations of this Example, the system can be utilized to send data to a cloud based server and/or control network routing functionality. The system may further utilize machine learning, artificial intelligence, and/or state-machine logic. The system may be configured and arranged to apply quality of service during congested periods, keep business or clients online during individual network downtime events, control the WAN connections for whole or specific networks, turn some VLANS off and leave others on during outages, shift DNS from non-encrypted to encrypted providers or shift DNS from encrypted to non-encrypted providers or shift to alternate DNS providers.

In another Example, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One Example includes a failover connection monitoring and validation system, including: a cloud server; a device probe configured to issue routed packets; and a policy routing enforcement system configured to route the routed packets for gateway resolution via the server. Other embodiments of this Example include corresponding computer systems, apparatus, and computer programs recorded on one or more computer storage devices, each configured to perform the actions of the methods.

Implementations according to this Example may include one or more of the following features. The failover connection monitoring system further including a scalable platform adapted to gather performance data on multiple internet connections simultaneously. The failover connection monitoring system further including a validation system, where the validation system is configured to provide connection validation for backup internet connections while they are otherwise not in use for to primary internet traffic flows. The failover connection monitoring system further including a secure system capable of making backup internet connection validations out-of-band. The failover connection monitoring system further including a failover appliance. The failover connection monitoring system further including a firewall. The failover connection monitoring system where the probe is an installable device. The failover connection monitoring system where the probe is software or firmware-based. The failover connection monitoring system where the probe is configured to be installed on a firewall. The failover connection monitoring system further including a firewall. The failover connection monitoring system where the firewall is configured to enforce policy routing. The failover connection monitoring system where the server is a cloud server. Implementations of the described techniques may include hardware, a method or process, or computer software on a computer-accessible medium.

In another Example, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One Example includes a LAN connection monitoring and validation system, including a cloud server; a local probe; and a firewall in operational communication with the local probe and cloud server via a primary connection and a secondary connection, where the local probe is configured to issue packets utilizing policy routing to route and label packets via the primary connection and secondary connection for resolution at the cloud server. Other embodiments of this Example include corresponding computer systems, apparatus, and computer programs recorded on one or more computer storage devices, each configured to perform the actions of the methods.

Implementations according to this Example may include one or more of the following features. The system where the LAN is configured to failover to the secondary connection when the primary connection is interrupted. The system where the LAN is configured to failback to the primary connection when connectivity is restored. The system where the system is configured to assess congestion via a summing approach. The system where the system is configured to balance traffic via the primary and secondary connections. The system where the server is configured to generate outage alerts. The system where the server is configured to identify packet latency and induce failover. The system where the server is configured to record network performance data. Implementations of the described techniques may include hardware, a method or process, or computer software on a computer-accessible medium.

While multiple embodiments are disclosed, still other embodiments of the disclosure will become apparent to those skilled in the art from the following detailed description, which shows and describes illustrative embodiments of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

BRIEF DESCRIPTION OF THE DRAWINGS

The novel features of the system are set forth with particularity in the claims that follow. A better understanding of the features and advantages of the system will be obtained by reference to the following detailed description that sets forth illustrative embodiments, in which the principles of the system, devices and methods are utilized, and the accompanying drawings of which:

FIG. 4EE is a continuation of the methods shown in FIG. 4E.

FIG. 5C depicts a further implementation of a dashboard.

FIG. 8A shows a flow chart of the system utilizing determining the last common hop and summing latency via route tracing.

FIG. 11A is a table showing latency summing, according to one implementation.

DETAILED DESCRIPTION

The various embodiments disclosed or contemplated herein relate to a monitoring and failover system and associated devices and methods. In various implementations, the disclosed devices, systems and methods relate to technologies that enable the monitoring of internet connectivity and failures, including the ability to identify and/or predict failures and change connectivity to a failover connection on a local network. In various implementations, the systems, devices and methods employ policy routing techniques to force packets to follow identified routes so as to monitor the connectivity of a local network from a remote server for display and control of the associated components. Several implementations and aspects of these approaches are described herein.

Figure 1A:
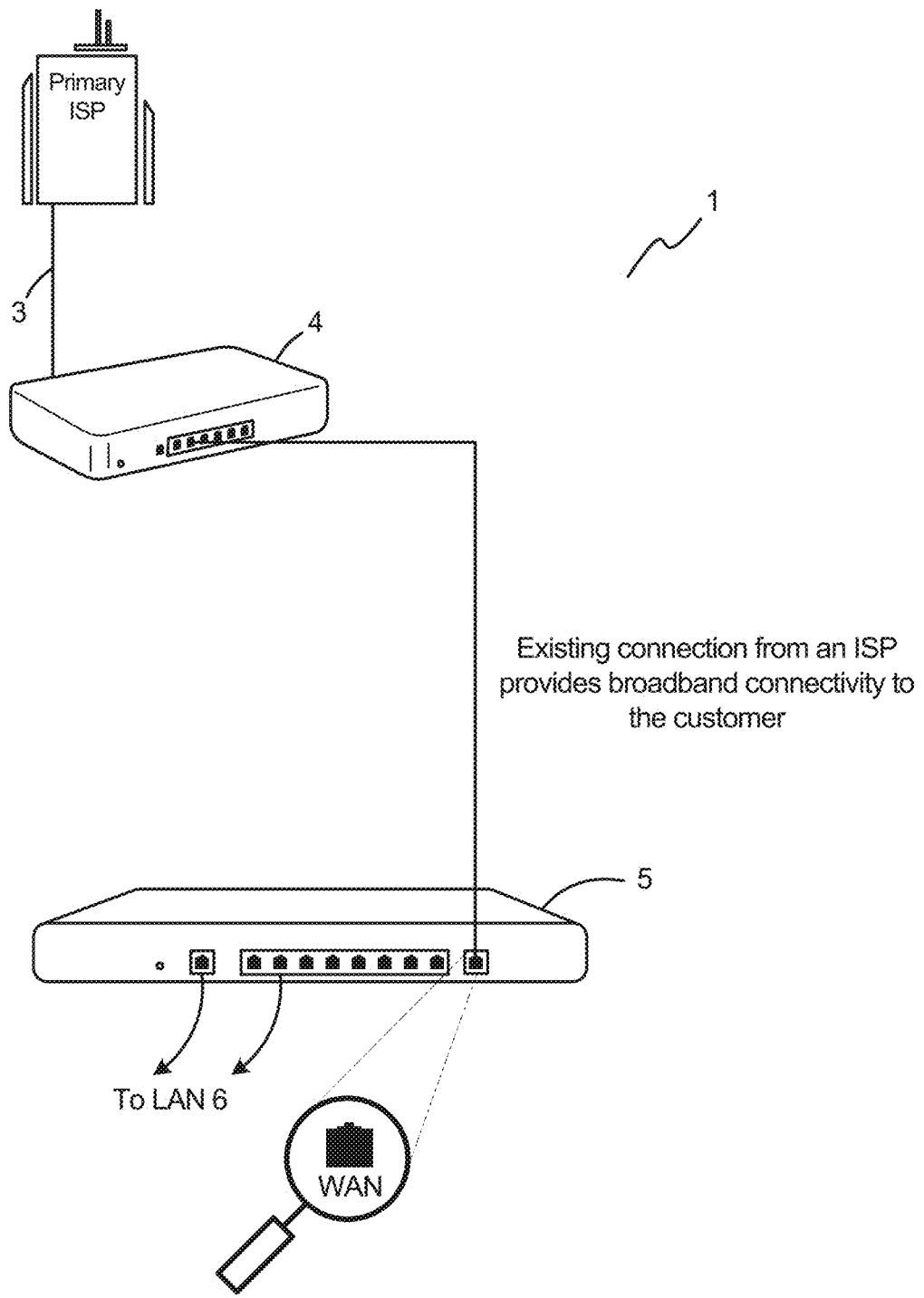
FIG. 1A is a schematic depiction of a typical local network connected to the internet.

FIG. 1A depicts a schematic view of a typical commercial retail network topology or architecture 1 having at least a router or firewall 5 connected to a DSL or cable modem 4 and primary internet connection 3. It is understood that in certain implementations, the firewall 5 and modem 4 may be integrated into a single unit, but for purposes of illustration herein, the modem 4 will be considered to be "outside" the firewall unless otherwise specified.

Figure 1B:
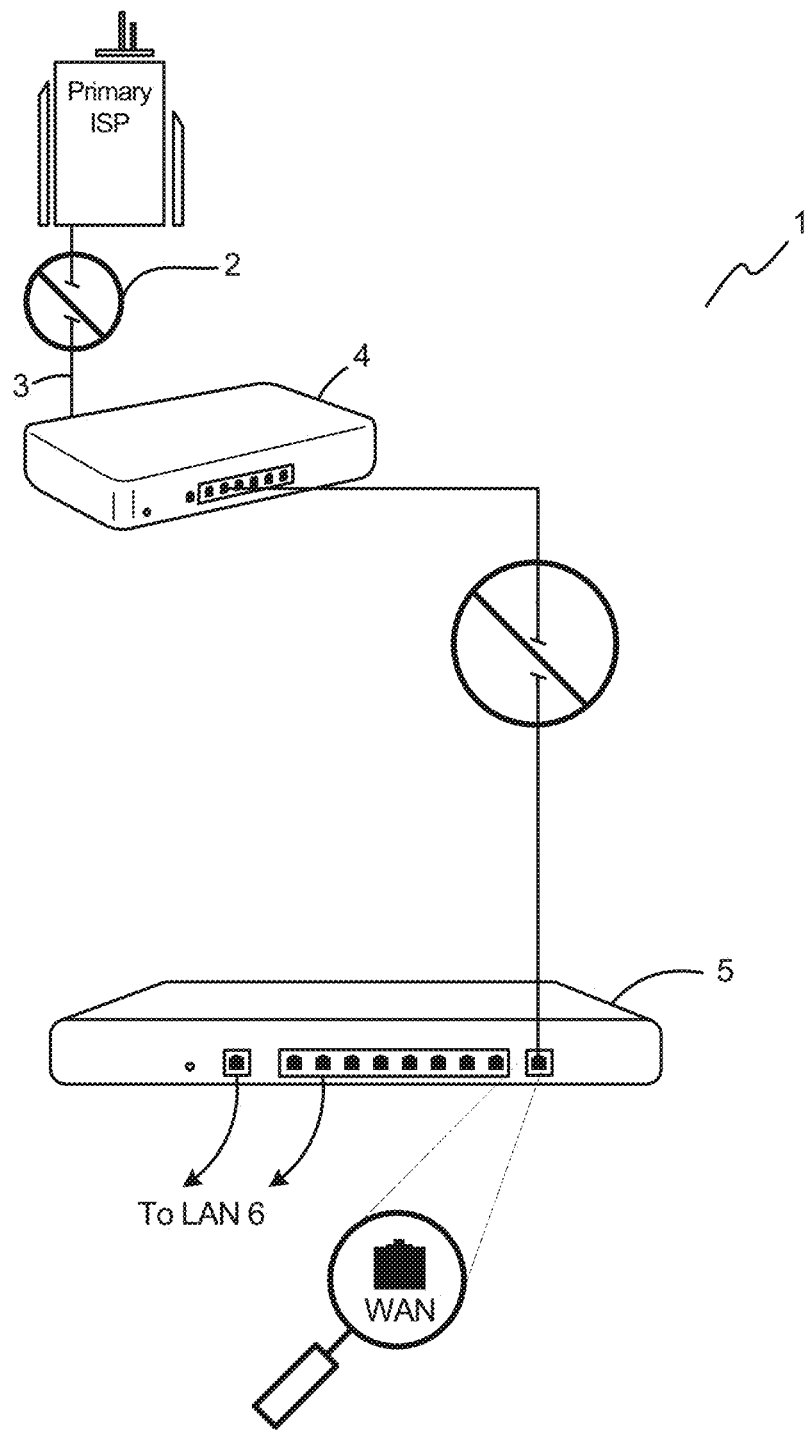
FIG. 1B is a schematic of the network of FIG. 1A undergoing an outage.
Figure 1C:
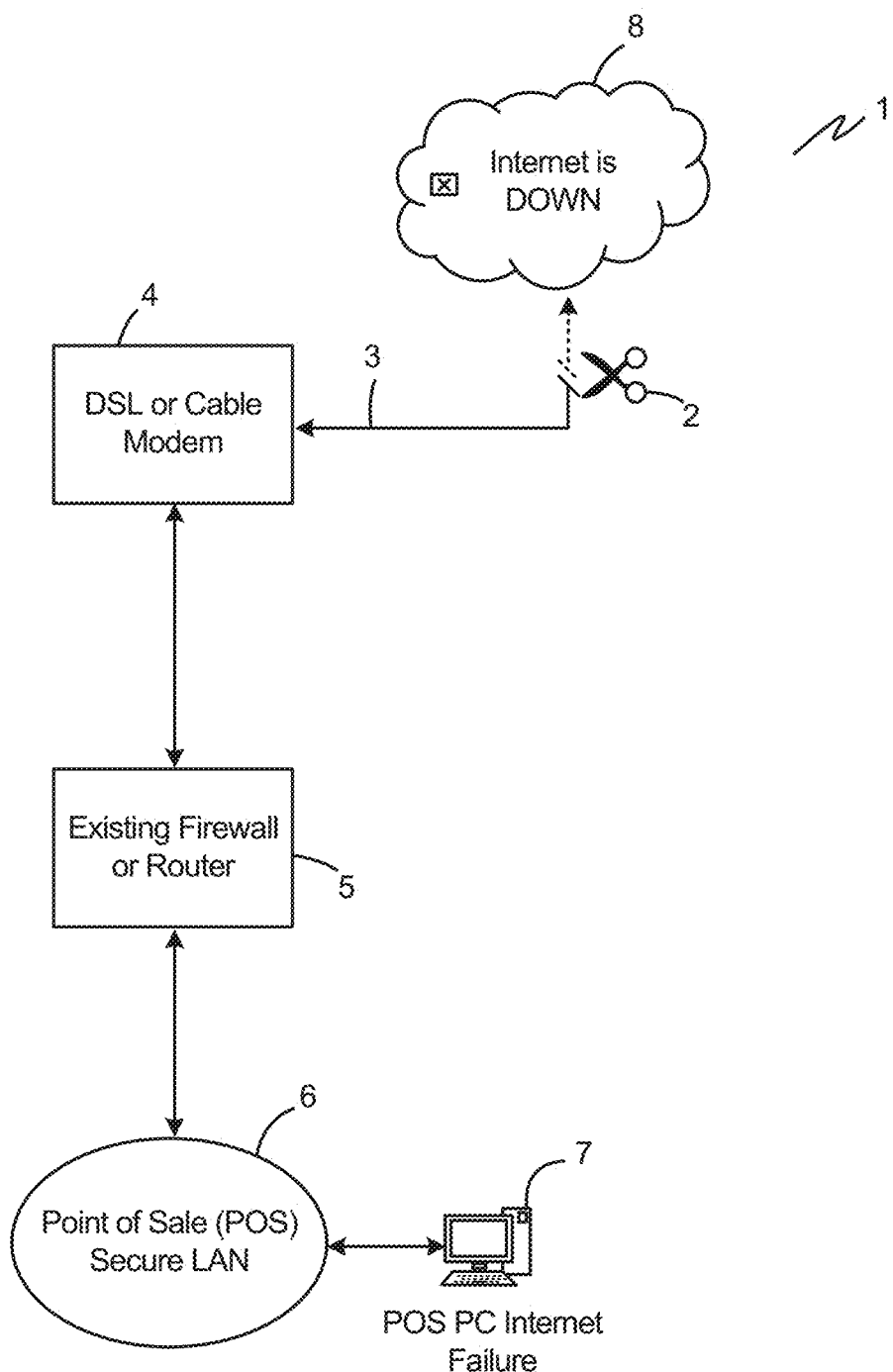
FIG. 1C is a schematic depiction of another typical network in a retail implementation, also undergoing an outage.

As best shown in FIG. 1B-C, as well known in the art, in a typical retail network 1, a service interruption 2, such as to a hard line primary connection 3 can disrupt network traffic between the modem 4, firewall 5, and various local area networks ("LANs") 6 and/or terminals 7 with the internet 8. These connections can be critical, for example in banking, industrial and retail settings, where each minute of a down connection can result in lost revenue or service.

Figure 2A:
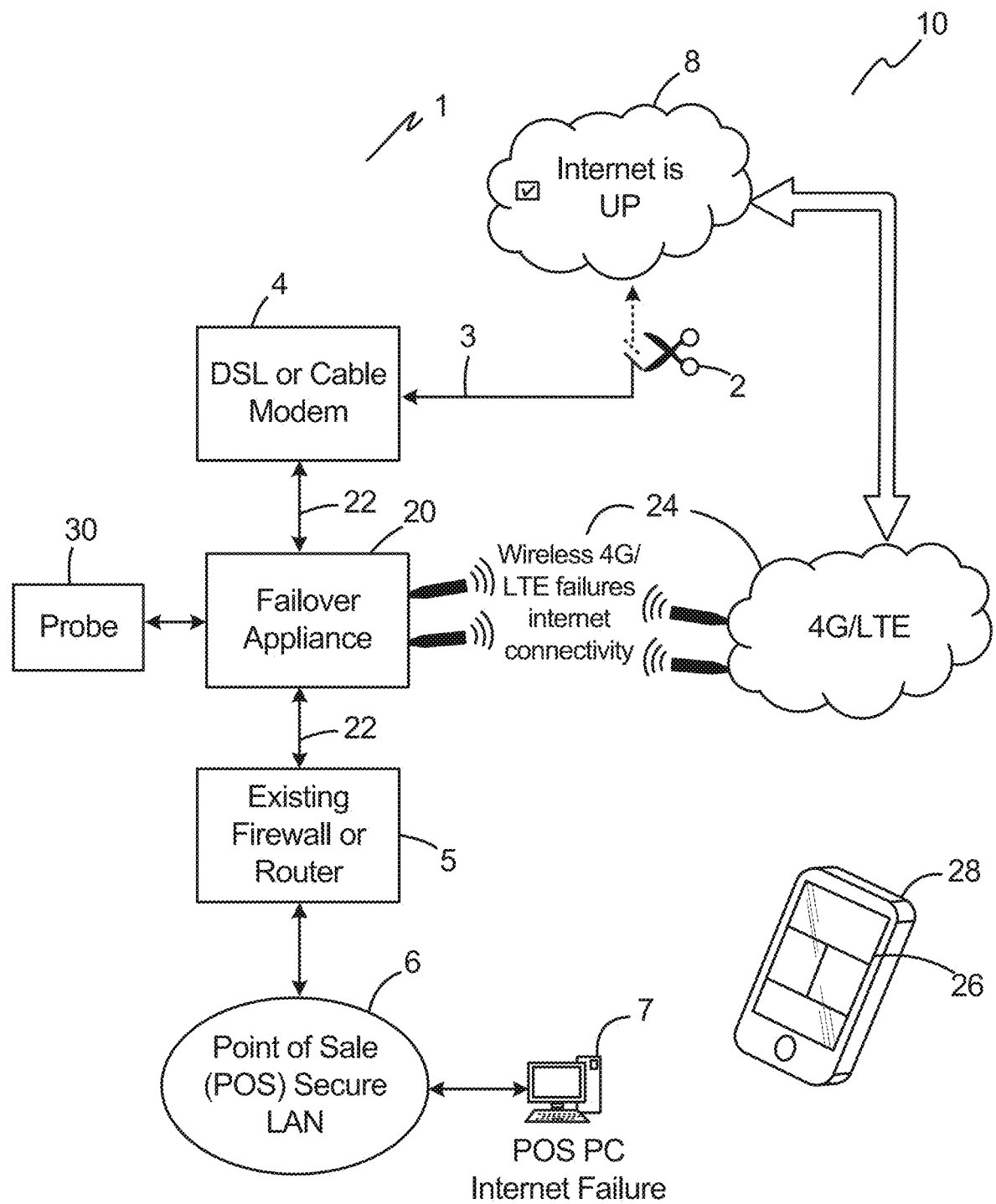
FIG. 2A is a schematic depiction of a typical local network connected to the internet and comprising a failover appliance and validation probe, according to one implementation.
Figure 2B:
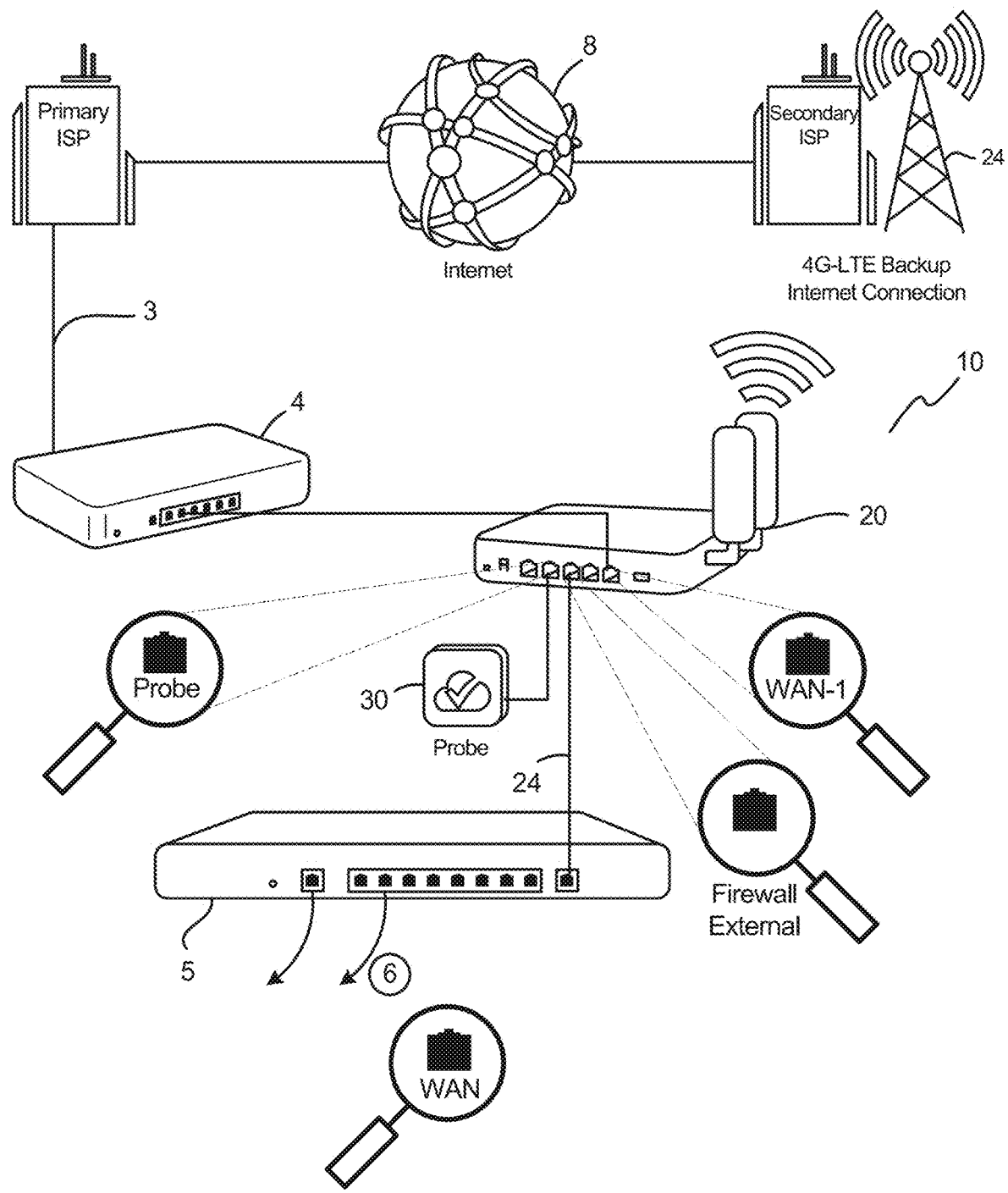
FIG. 2B is a schematic depiction of a typical local network connected to the internet and comprising a failover appliance and validation probe, according to another implementation.

As is shown in FIGS. 2A-2B, various implementations of the failover system 10 provide a wireless failover appliance 20 or various alternate methods of maintaining network uptimes. Accordingly, exemplary implementations of the presently-disclosed system 10 provide a failover appliance 20 in operable communication with at least one failover connection 24, such that in the event of a primary connection failure, the network 1 can "failover" to the failover connection 24 and maintain local internet access. It would be understood that many configurations are possible.

In the implementations of FIGS. 2A-2B, the failover appliance 20 is installed in-line between the modem 4 and router 5, for example by way of Ethernet cables 22. As discussed further below, in alternate implementations the failover appliance 20 can be integrated directly into either the modem 4, router 5 or other appliance, and can be hardware but also firmware or software configured to improve the functioning of the installed device.

Continuing with the implementations of FIGS. 2A-2B, in the event of an interruption 2, the otherwise dormant failover appliance 20 is configured to establish an active failover connection 24, that is, the probe is capable of connecting the router or firewall 5 and associated network devices to the internet 8. In certain implementations, the connection is established via a wireless connection 24, such as an LTE, 4G, 5G or other next generation connection 24, such as a satellite connection. In alternate implementations, further connection methods such as alternate wired connection methods known in the art can be utilized. Importantly, and as would likewise be understood, the failover connection of these implementations must make use of an alternate connectivity infrastructure to be effective, as an alternate modem utilizing the same ISP connection would only be useful in circumstances where the primary modem is the source of the failure.

To illustrate this distinction, in the implementations of FIGS. 2A-2B, the failover appliance 20 is configured to detect interruptions 2 in internet 8 connectivity and automatically connect the local network (shown generally at 6 and 7) via the wireless connection 24, thereby preventing any downstream internet connectivity, such as at the LAN 6 and/or terminals 7. As would be understood, because the failover appliance 20 of the implementations of FIGS. 2A-B is running a distinct wireless connection 24 from the primary connection 3, the failover appliance 20 improves uptimes, as it is unlikely that both connections 3, 24 will be interrupted at the same time.

It is understood that such a wireless connection 24 is typically considerably more costly to use over time than the wired primary connection 3, and may be slower or face other challenges understood in the art. Therefore, in certain implementations, when the primary connection 3 is back online, it is typically highly preferable to failback to the primary connection 3 and resume "normal" service, wherein the system returns to routing the network traffic through the primary connection 3. Further, as would be appreciated by one of skill in the art, when the failover appliance 20 is functioning properly and providing seamless transition to the wireless connection 24, a terminal 7 user may not even be aware that the change in route to the internet has been made in either direction, that is between the primary 3 and secondary 24 connections. In certain circumstances, it is possible that the failover appliance 20 will continue to provide internet connectivity after the primary connection 3 has been restored.

One important aspect of the system, according to certain embodiments, is being configured to enforce policy routing, such as via a policy routing system (shown generally at 10). That is, in various implementations, the policy routing system 10 is configured to generate and route packets with specificity and/or precedence through several connections 3, 24. In these implementations, these policy routed packets are received (or not) remotely by resolution on a server 40, thereby allowing users to validate the individual connections. Alternate implementations can incorporate static routes with affinity, precedence, and/or metrics. Further explanation of these implementations follows.

As is also shown in FIGS. 2A-B, in accordance with certain implementations of the system 10, a packet-generating connection device or probe 30 is provided. In various implementations, the probe 30 is an "internet of things" appliance installed in the network 1 and downstream of, or otherwise in electronic communications with, the connections 3, 24. The probe 30 is configured to perform active multi-WAN (wide area network) connectivity testing on regular intervals, as discussed herein. As discussed further below, in alternate implementations, the failover appliance 20 can be integrated directly into either the modem 4, router 5 or other appliance, and can be hardware but also firmware or software configured to improve the functioning of the installed device. In various implementations, probe 30 software can be run on a desktop, a client application on any LAN connected device, an iOS or Android application, a firewall, server, phone, or other device appreciated by those of skill in the art. In various implementations, by utilizing a hardware probe 30, test traffic—packets—can be generated and the failover appliance 20 can operate in an IP-pass-through mode.

In accordance with one implementation, the probe 30 performs connection monitoring by generating traffic from within the local network 1 that is tagged and specifically routed through the various connections 3, 24 for collection and analysis on a cloud 40 server which is connected to a database, and various networked components known in the art and understood to enable the systems and methods disclosed herein.

In one implementation, the database (also represented generally at 40) comprises a central processing unit ("CPU")

and main memory, an input/output interface for communicating with various databases, files, programs, and networks (such as the Internet, for example), and one or more storage devices. The storage devices may be disk drive devices, CD ROM devices, or elsewhere in the cloud. The server 40 may also have an interface, including, for example, a monitor or other screen device and an input device, such as a keyboard, a mouse, a touchpad, or any other such known input device. The server 40 in various implementations can have a database 40A that is integral to a processor or accessible to the processor through a computer network or other suitable communication link. In one embodiment, the database 40A is comprised of a plurality of database servers, some or all of which can be integral to the central processor or alternatively can be physically separate from the processor.

As would be appreciated by one of skill in the art, when signals sent from the probe 30 to the server 40 are not routed as described below, that test traffic can validate the performance and function of various network connections 3, 24. In certain implementations, the status of these various connections 3, 24 is able to be viewed on a dashboard 26 on, for example, a terminal 7 or mobile device 28, as is shown in FIGS. 5A-5D, below. Further, in these implementations, overviews of several networks and other useful information such as usage statistics 29 can be displayed, as would be understood by one of skill in the art. Moreover, the server 40 itself can collect data about the performance and utilization of numerous individual local networks 1 for optimization, load shifting and notification purposes, as is described in detail below.

Figure 3A:
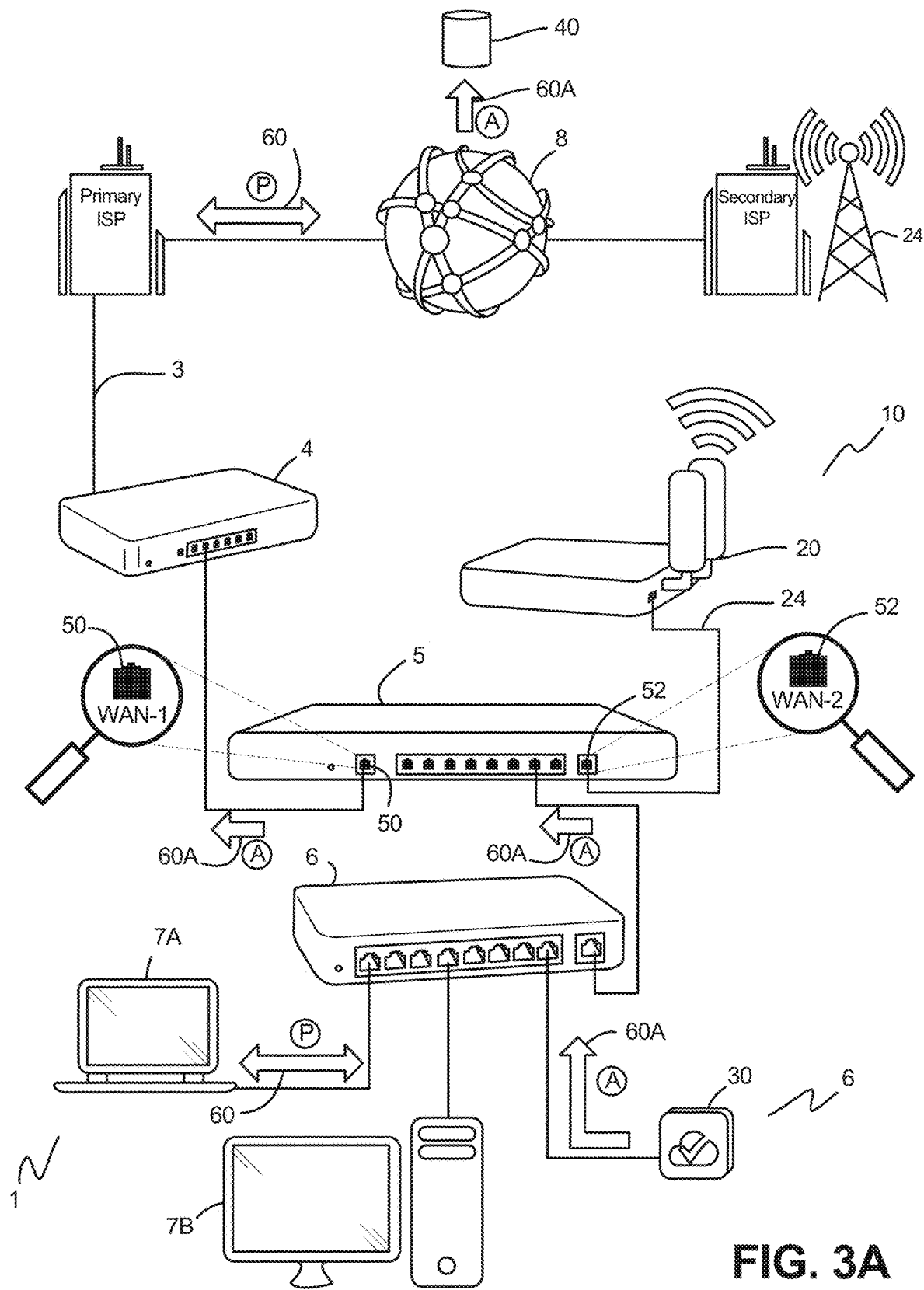
FIG. 3A is a schematic depiction of a typical local network connected to the internet and comprising several internet connections and a validation probe, according to an exemplary implementation.
Figure 3B:
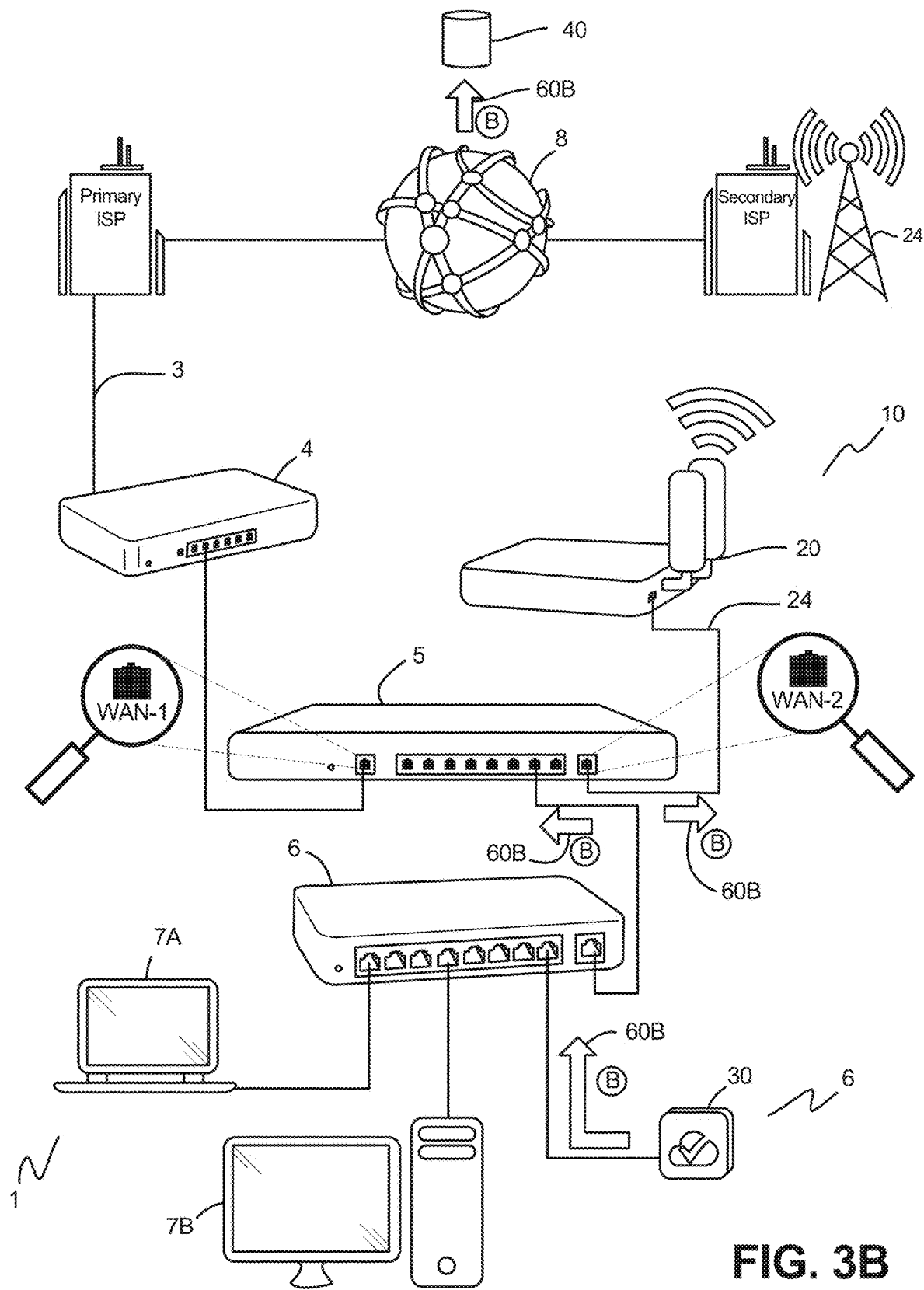
FIG. 3B is a schematic depiction of a typical local network connected to the internet and comprising several internet connections including a wireless failover device and a validation probe, showing the routing of test traffic or packets, according to an exemplary implementation.
Figure 3C:
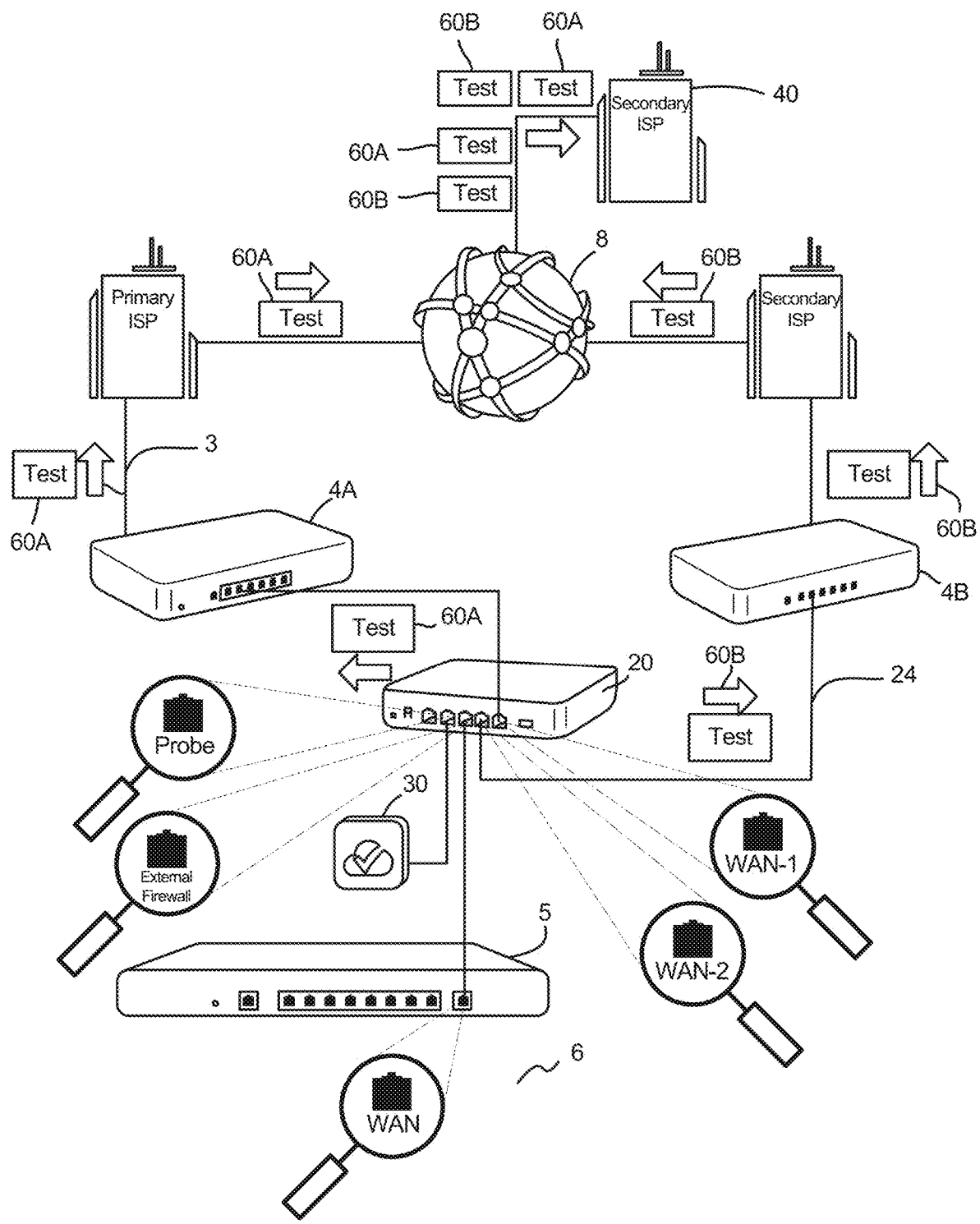
FIG. 3C is a schematic depiction of a typical local network connected to the internet and comprising several internet connections including a validation probe, showing the routing of test traffic or packets, according to an exemplary implementation.

Turning to FIGS. 3A-3C, in certain implementations the probe 30 or other packet routing component can be installed "outside" a firewall, so as not to impose a security risk to the underlying client network. For example, and as is shown in the implementations of FIGS. 3A-3C, the probe 30 can be implemented outside, such that the normal traffic exiting the LAN network 6 is encrypted prior to being routed through an extra-networked router/failover device configuration, and the system can be implemented in conjunction with that extra-networked failover connection.

In the implementations of FIGS. 3A-C and FIGS. 4A-4D, the probe 30 (or firewall 5 in fully-integrated applications) generates test traffic in the form of routed packets. is routed to a server 40 such as a cloud server 40 for analysis. This routing process can comprise several steps. In various implementations, once a number of test traffic packets aren't received by the server within a specified window of time, the system 10 alerts that a connection may be down. It is understood that by constantly validating multiple connections, the system's 10 use of probes 30 to emit packets that are routed to a cloud server for analysis functionally moves the logic of connection validation ("Are we online/offline/failed over?") from a client network 1 and/or LAN 6 to the cloud/external server 40. In various implementations, this remote assessment provides valuable benefits to users, as will be explained herein.

Figure 4A:
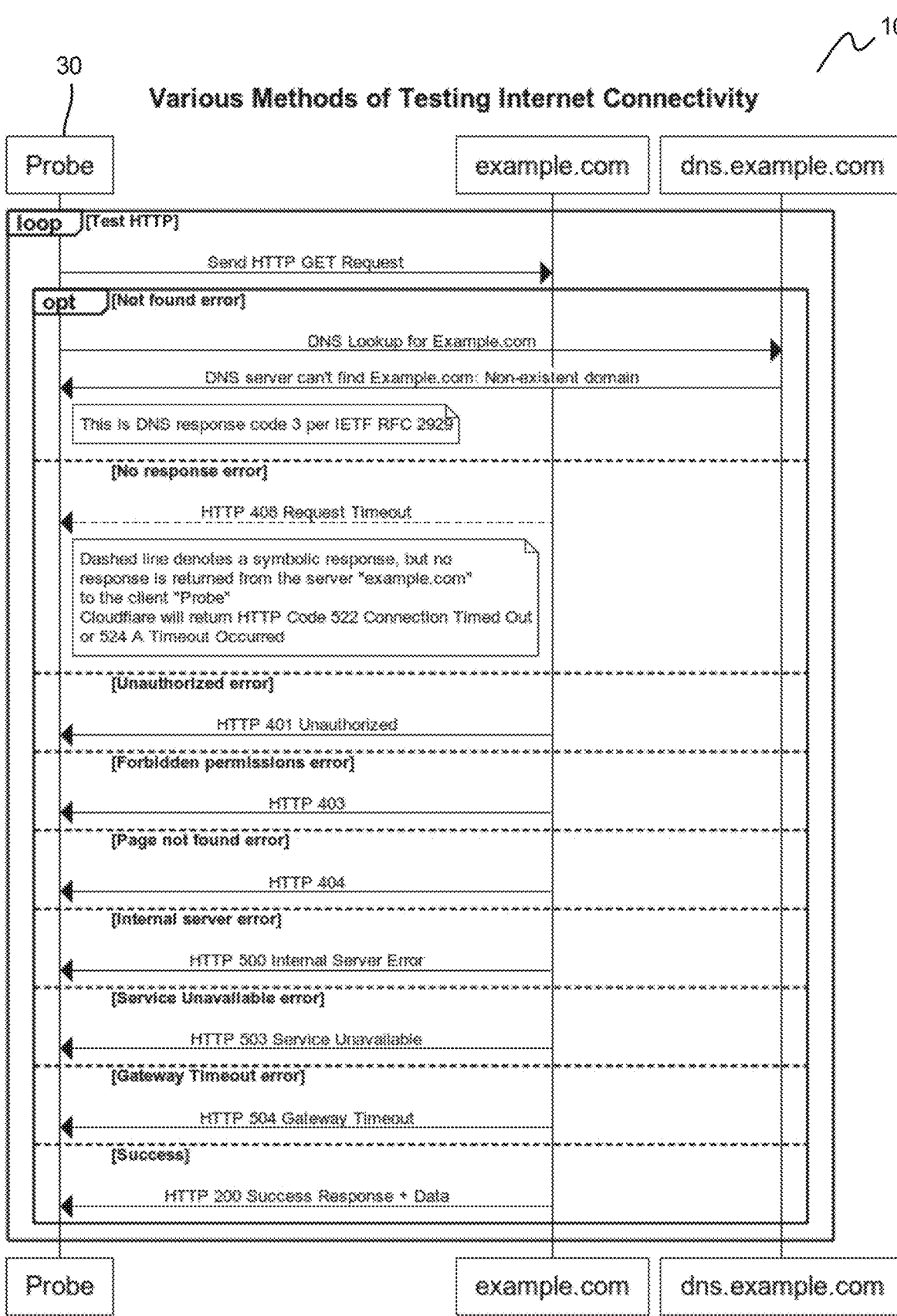
FIG. 4A depicts several methods of testing internet connectivity.
Figure 4B:
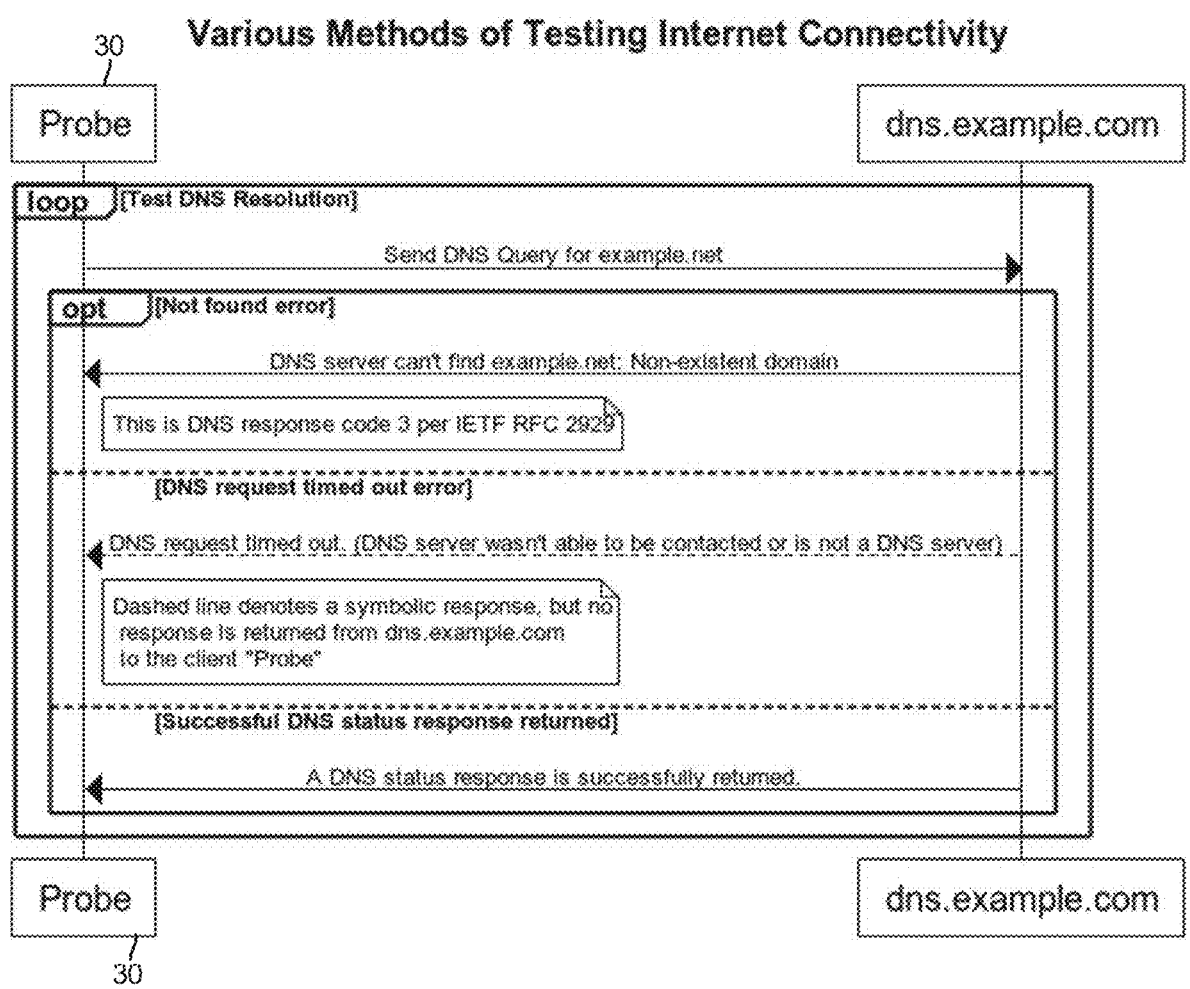
FIG. 4B depicts several methods of testing internet connectivity.
Figure 4C:
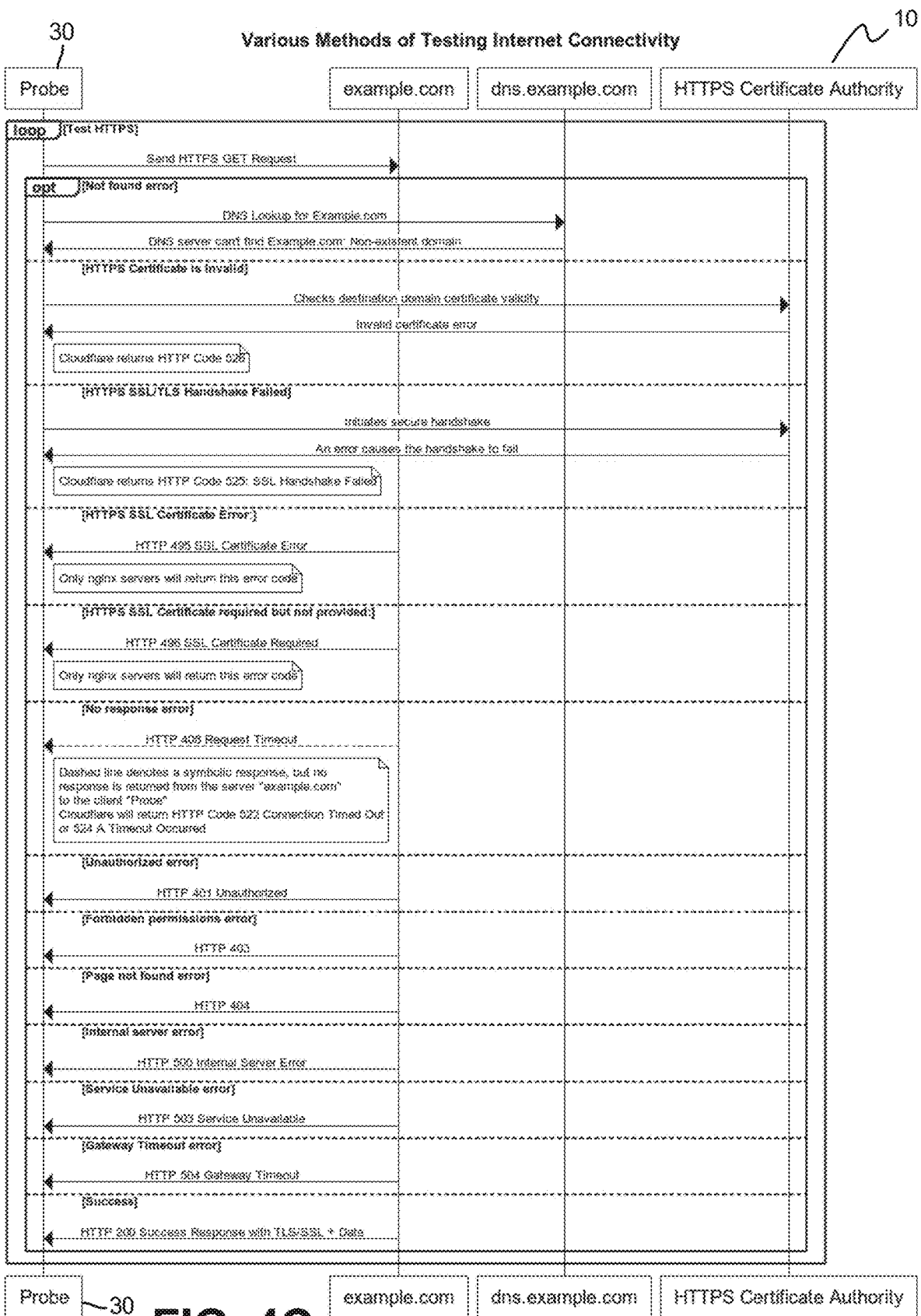
FIG. 4C depicts several methods of testing internet connectivity.
Figure 4D:
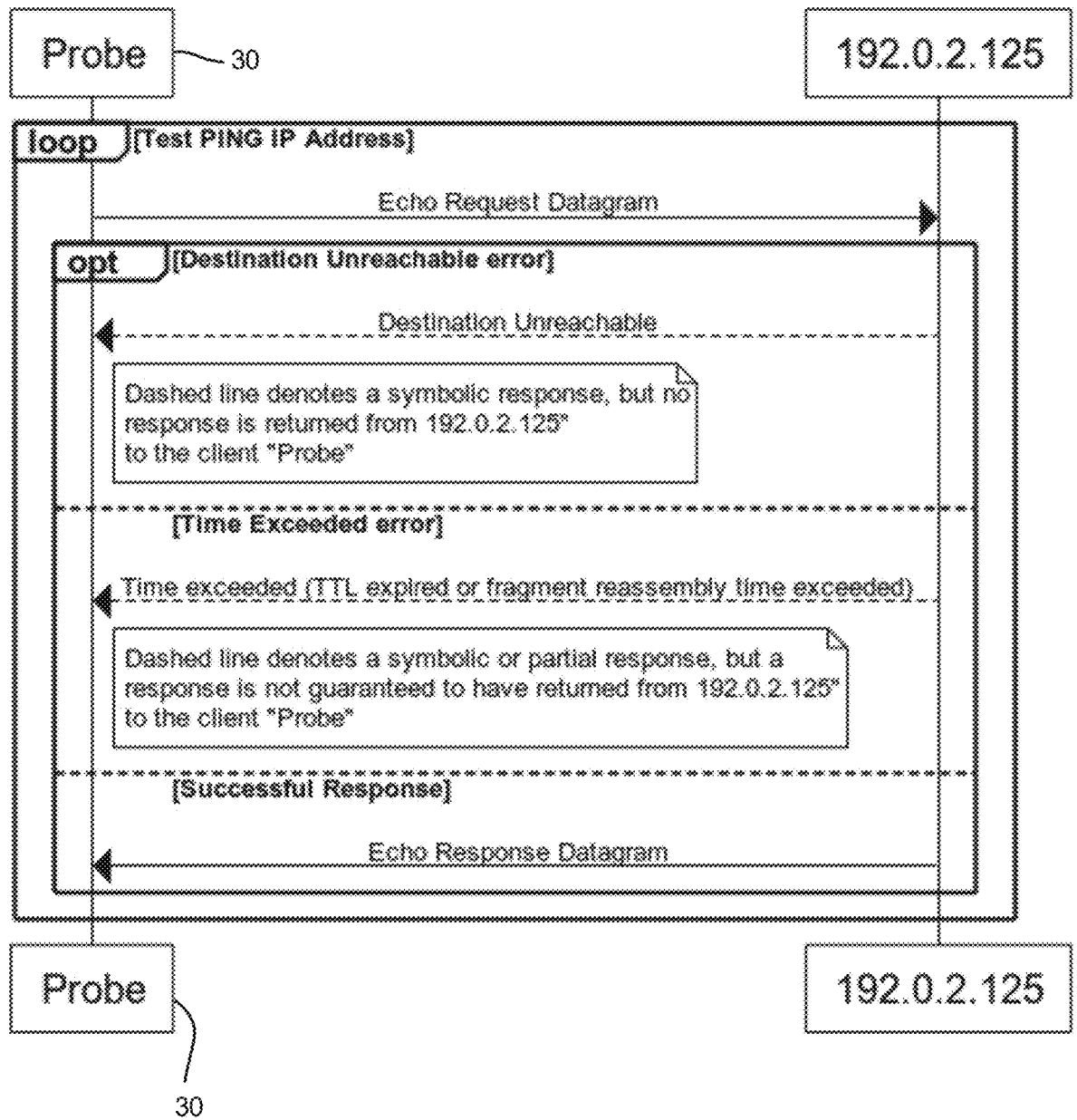
FIG. 4D depicts several methods of testing internet connectivity.
Figure 4E:
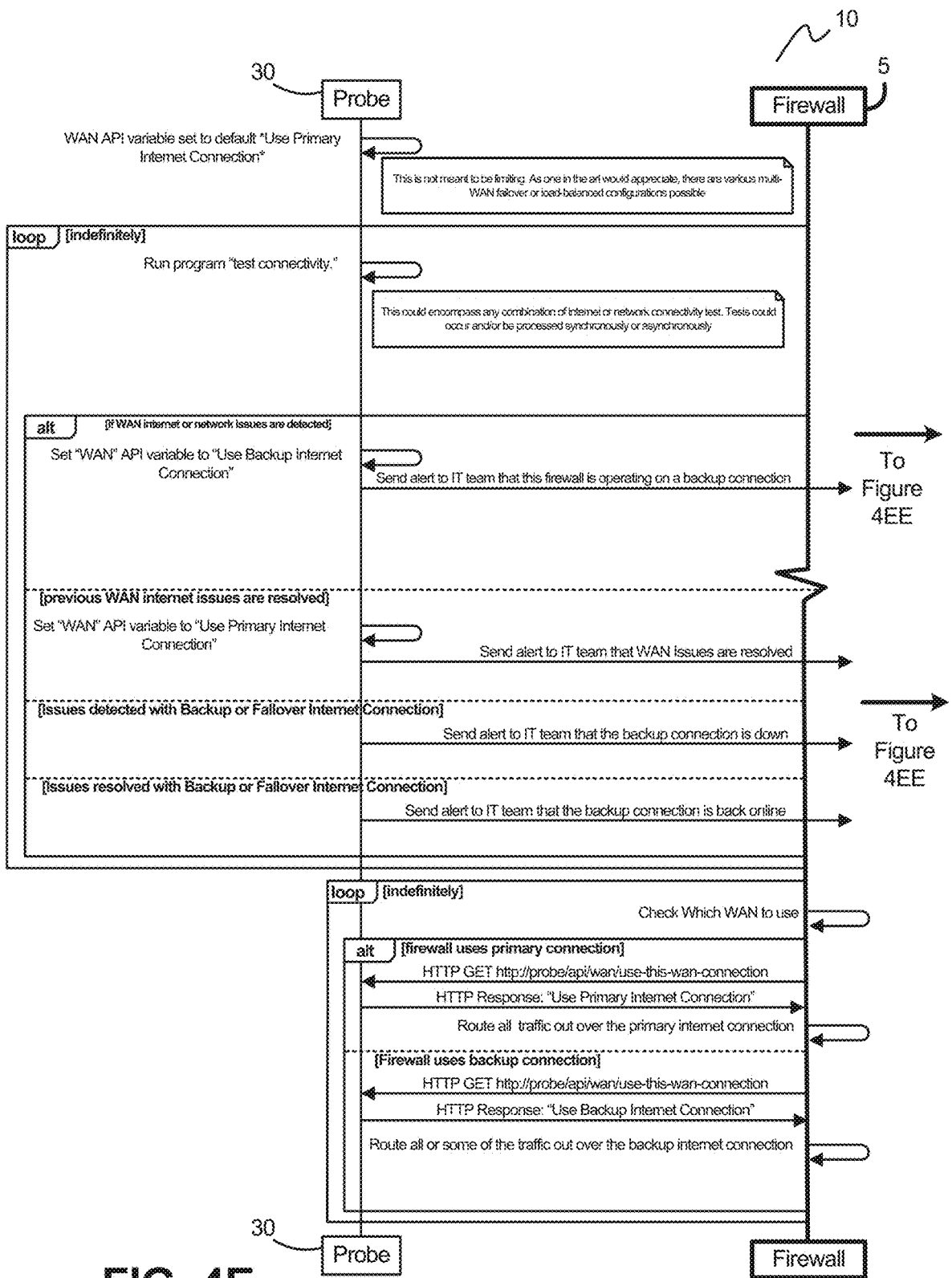
FIG. 4E depicts several methods of testing internet connectivity.
Figure 4E:
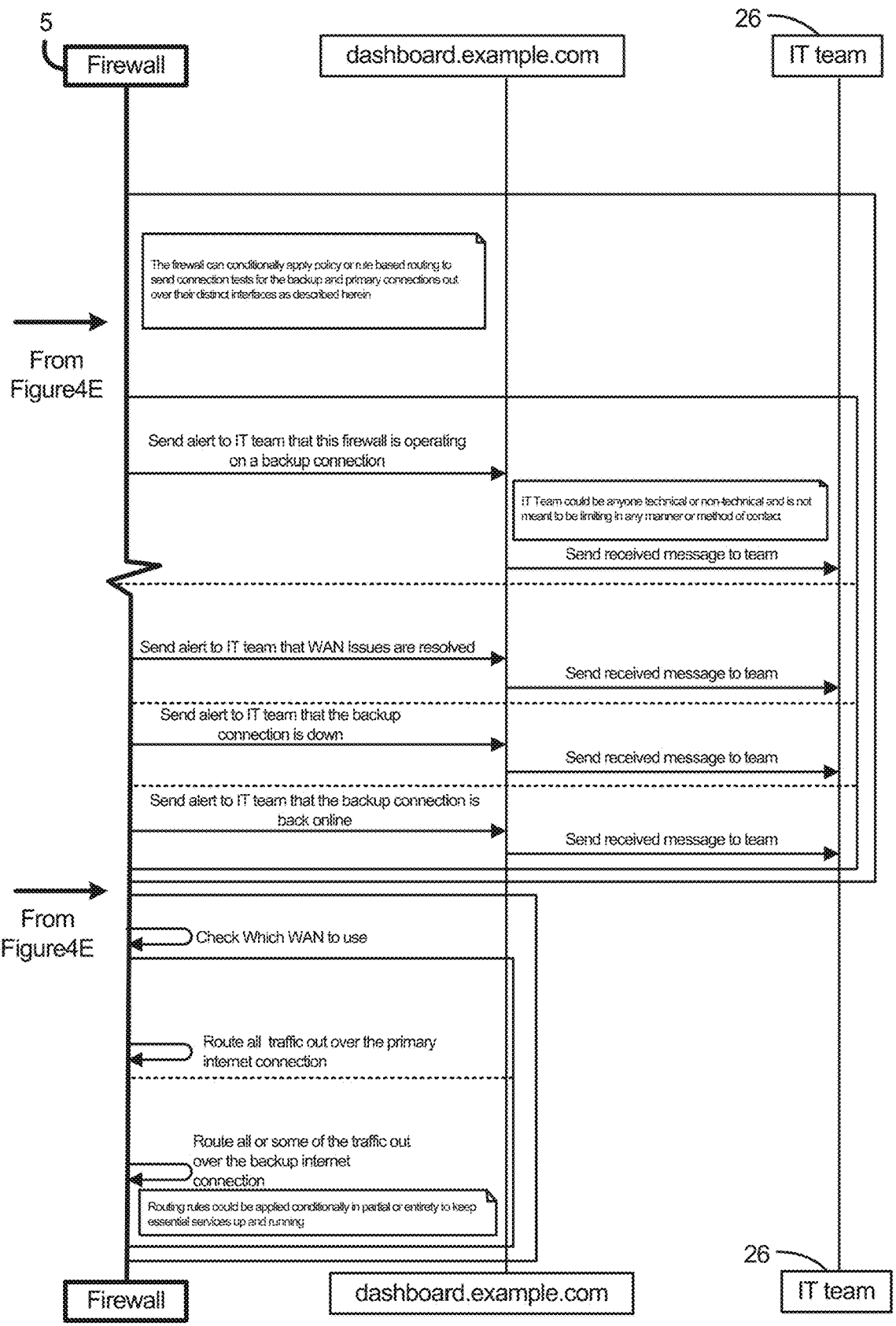
Figure 5A:
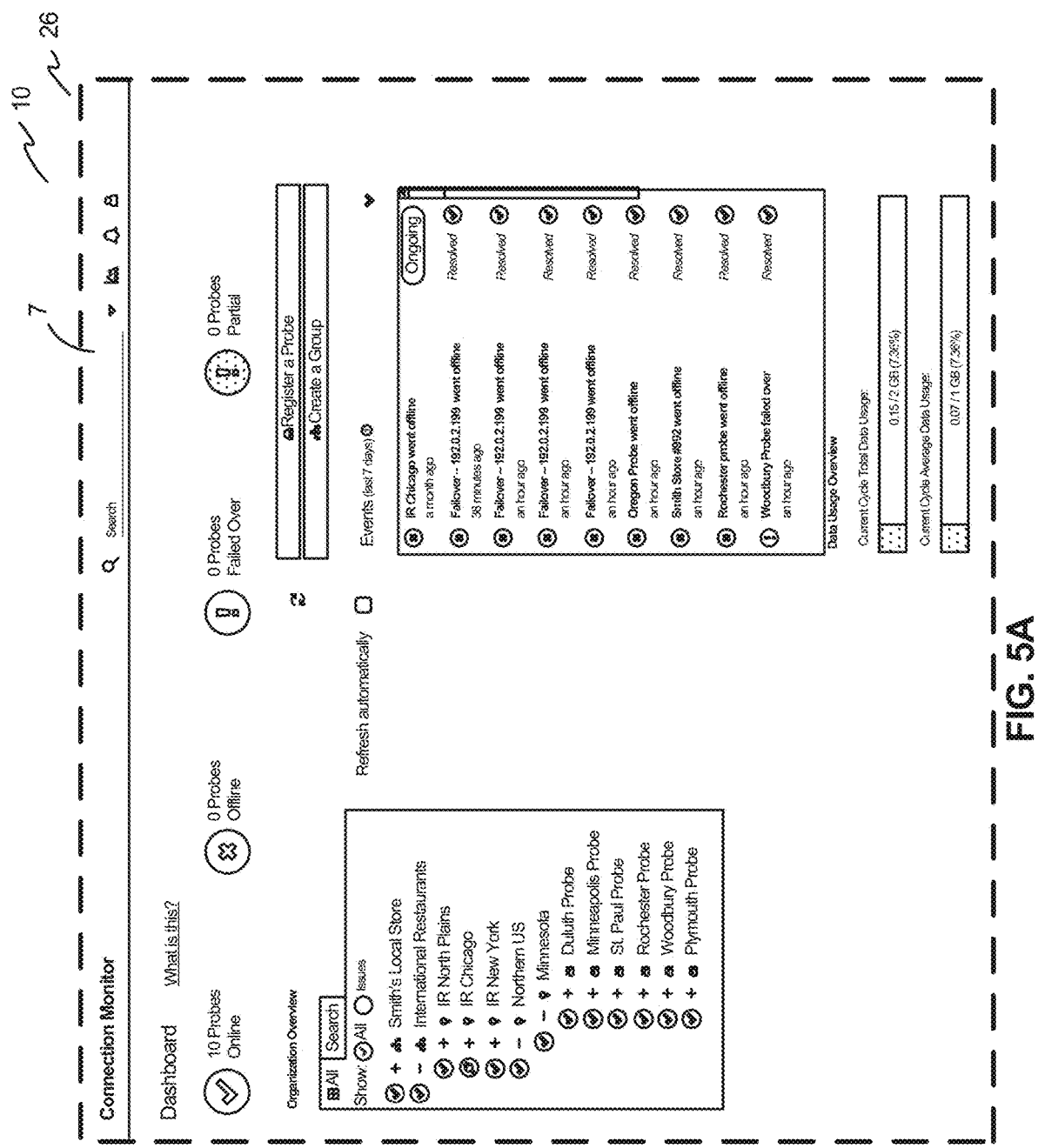
FIG. 5A depicts one implementation of a dashboard.
Figure 5B:
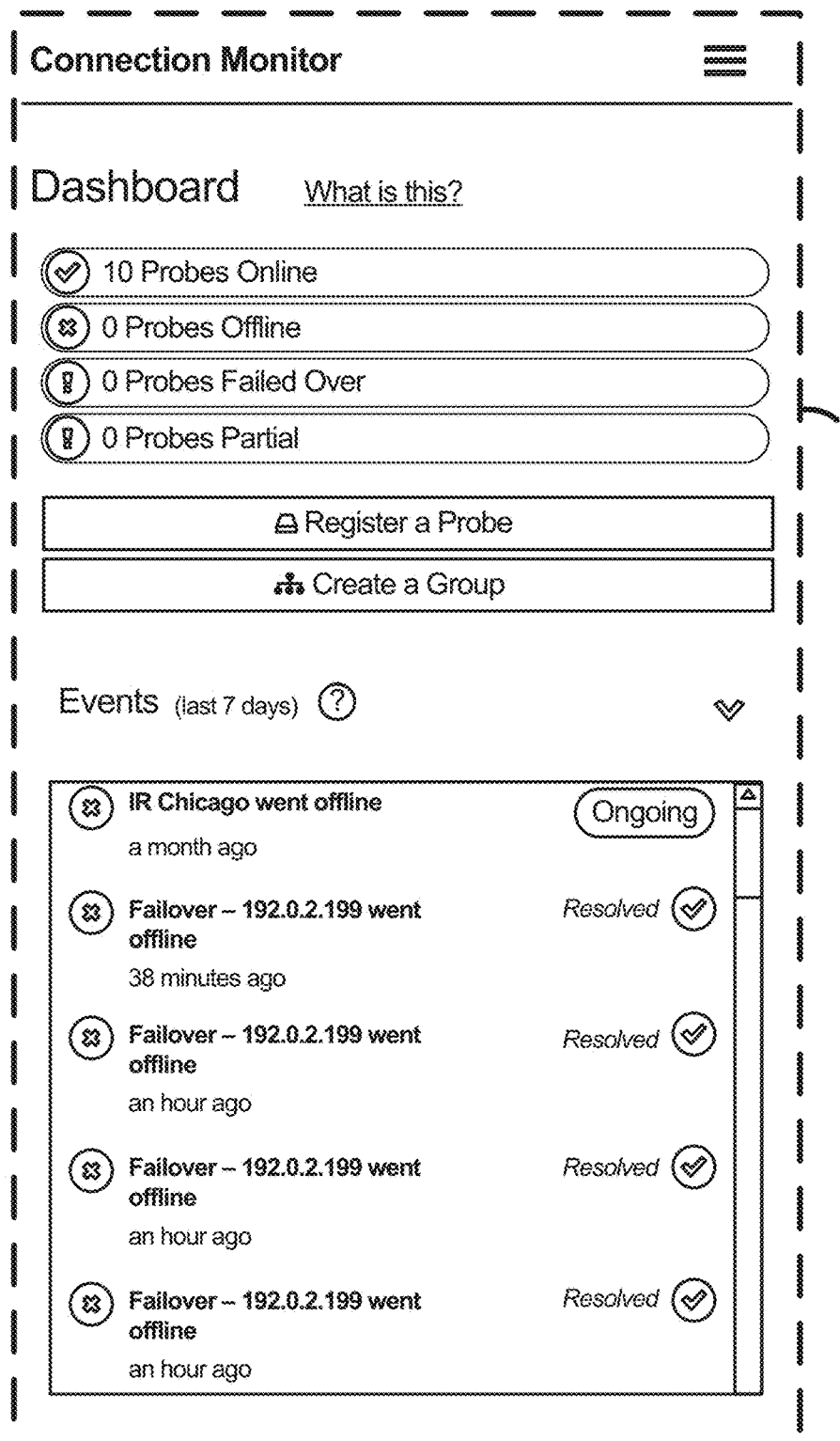
FIG. 5B depicts a further implementation of a dashboard.
Figure 5D:
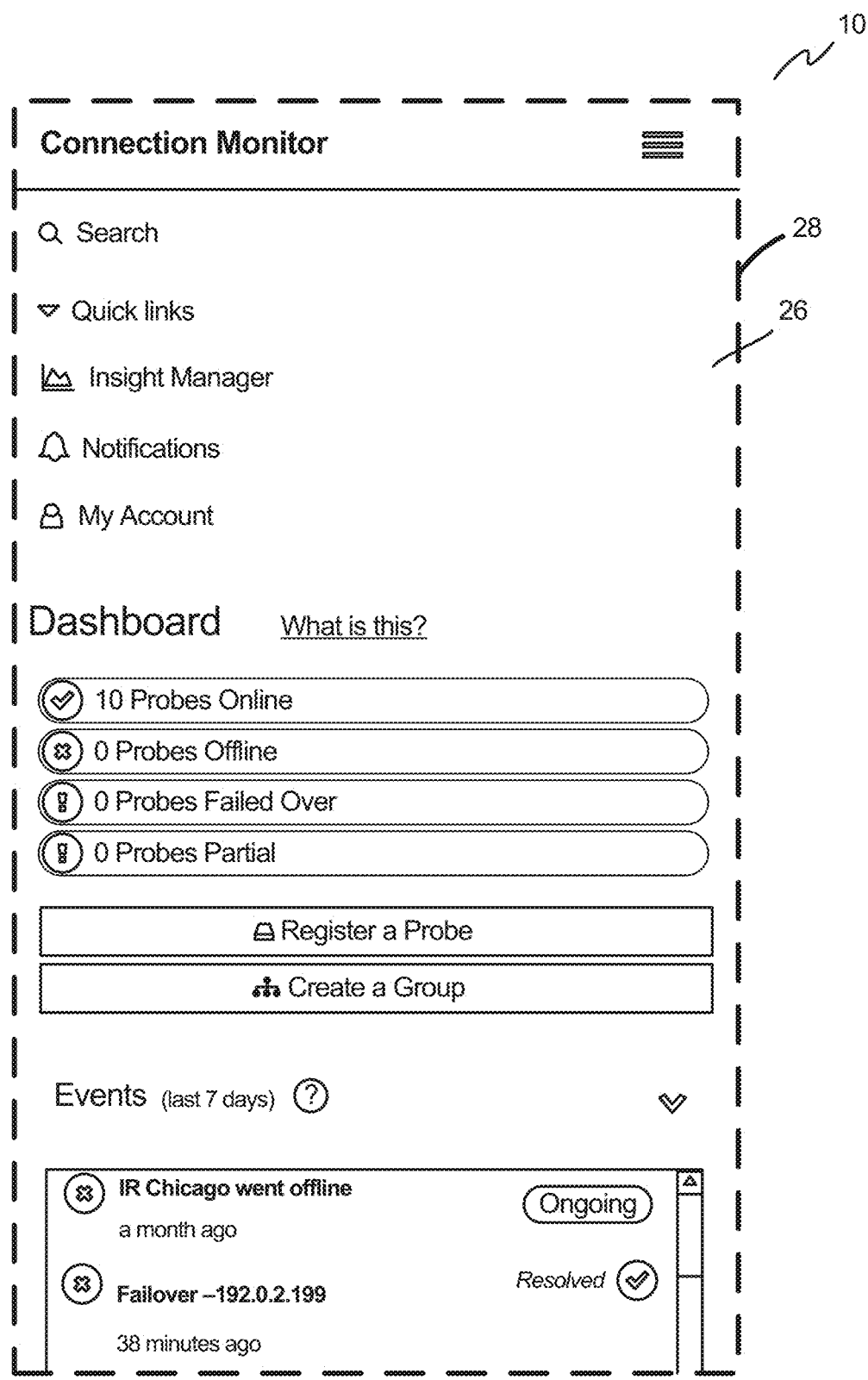
FIG. 5D depicts an even further implementation of a dashboard.

As shown in FIG. 4E, in certain implementations, the system 10 can force the use of a specific or defined WAN connection. It is appreciated that the system 10 is therefore able to monitor router misconfiguration errors, slow connections, or any other number of issues related to the connection or collection of connections at a location. As one in the art would understand, these processes can be as complex as the logic in the code is defined. In the context of machine learning, artificial intelligence and the like—where these states may be generated by code interpreting data, the states can be even more granular. For example it is understood that these implementations make it possible to detect a service interruption/partial data loss to various local or internet resources or sets of resources. Further discussion of these larger implications and data collections can be found below in relation to FIGS. 6A-6C.

In various implementations, the system 10 validates individual connections by sending "pulses" of data packets from the probe 30 to the cloud 40 servers, where the pulses are received, for example via an application programming interface ("API"). In various alternate implementations, the probe 30 functionality can be integrated with the firewall 5, such that the firewall 5 performs the described functions and generate the disclosed test traffic. In yet further implementations, other network devices including but not limited to wireless access points, network attached storage ("NAS") devices or the failover appliance 20 (as shown in FIGS. 2A-2B) can also run the software agent to perform the disclose network validation tests in accordance with the API. However, for brevity here, the network validation steps contemplated by both implementations will be described with reference to the probe 30.

As shown in FIGS. 4A-4E, in certain implementations, the probe 30 can be configured for testing multiple ports and protocols and other various methods for testing internet connectivity and stability to then subsequently control failover in a firewall/router on a local network 1, that is without the use of a non-local connection to the cloud.

It is understood that in these implementations, and as shown in FIG. 4A-4E, a probe 30 on the network can also be used to test internet connectivity and select the proper route through a variety of approaches. That is, in certain implementations it is possible to monitor connectivity via DNS connectivity (FIG. 4A-4B) to a specific web site or other resolved host, intermittent packet loss over HTTP/S (FIG. 4C) or PING (FIG. 4D), or by monitoring trace route changes (as is discussed further below). And in any combination of these scenarios, the probe 30 can test (FIG. 4E) and/or signal the firewall 5, router or other WAN traffic flow control device to failover from a primary to a backup or tertiary connection. As would be appreciated by one of skill in the art, while a variety of approaches are possible, in these implementations the system 10 is able to establish the location of a network failure and route network traffic in response around that failure.

In the implementation of FIG. 4A, the probe 30 is able to route a request 100, such as an HTTP GET request 100 to a specific target domain 100, such as example.com 100. One of skill in the art would appreciate the wide variety of implementations possible, as are contemplated in the attached figures. In this way, it is possible to achieve diverse route monitoring with the cloud functionality discussed herein as well as additional local failover control, as would be understood by one of skill in the art.

In various implementations, the system 10 can utilize the timing of the packets being sent to detect a down connection. Such as, if packets are being sent every second or minute, the system may be configured to establish a threshold such that two misses will be considered to indicate a downed connection. It is understood that the network administrator will be able to configure the number of misses that are appropriate for individual applications on the basis of the specific hardware at use in that implementation and the overall desirability of false positives and/or false negatives. It is understood that in alternate implementations, a network administrator is not essential, and automated processes can be used to configure the system features, some non-limiting examples being artificial intelligence, machine learning and state system logic.

Further, it is understood that the resistance of the system in certain implementations may requires an additional lag time be included in the thresholding calculation. For example, in one exemplary embodiment, a system pulses out a packet over the primary connection every minute, and it is understood that the system resistance thresholding coefficient is set to a lag time of about 17 seconds, a total time of 2:17—two misses (one per minute) plus lag coefficient 17 seconds) can be used to validate that a connection is down. Therefore, in such an embodiment, the system can indicate to users that a system is down after 2:17, utilizing an equation of timing of the misses plus lag time. It is understood that in various implementations, lag calculations of 0.0 seconds to 59 seconds or more may be used. Other amounts are of course possible in alternate implementations. It is further understood that in certain implementations, the pulse frequency and lag coefficients for primary and backup connections may vary, such as pulsing the backup connection less frequently to conserve data usage.

Accordingly, in one exemplary implementation, a test packet is sent to the server every second, and if two packets are missed the system 10 is alerted that a connection may be down. When calculating the time that must pass before a connection is deemed down the system must consider lag time created by resistance in the system. Such that, if a packet is sent every second and if when two packets are missed the system 10 is alerted that a connection is down, and the resistance of the system 10 creates a lag time of 0.17 seconds, then if 2.17 seconds passes without the server receiving a packet the connection is deemed down. It is readily apparent that a large number of possible lag times can be used and calibrated to the individual network environment, resistance times and the like.

In various implementations, the system 10 can utilize the policy routing of individual packets to validate the various connections 3, 24 remotely, for example with a remote cloud 40 server. In certain implementations, the status of the various connections 3, 24 is able to be viewed on a dashboard 26 on, for example, the terminal or mobile device 28, as is shown in FIGS. 2A-2F. In these implementations, the system 10 can monitor the "health" of the various connections 3, 24 and the route of internet traffic from, for example, the terminals 7 to the internet 8, and whether it is proceeding through the modem 4 or the wireless appliance 20.

In some embodiments machine state-machine logic, artificial intelligence, and/or machine learning is implemented to run on a network appliance in the place of server-side logic. The network appliance is used to send data to a server and/or control network routing functionality. Examples may include: applying quality of service during congested periods, keeping connections online during network downtime events, controlling the WAN connection that is used for whole or specific networks, turning some VLANS off and/or leaving others on during outages, and shifting DNS from non-encrypted to encrypted providers and from encrypted to non-encrypted providers or switching providers if issues are noticed.

Returning to the implementations of FIGS. 3A-3C, the probe 30 of these implementations is configured to issue packets that are routed and resolved so that the connection 3, 24 used can be detected at the cloud 40 server. In the implementations of FIGS. 3A-3C, the local internet configuration 1 has a firewall 5 that is operably connected via a network interface 50 to a broadband modem 4 and the primary connection 3. In the implementations of FIGS. 3A-4C, the firewall has another interface 52 that is operably connected to the failover wireless connection 24 by way of the failover appliance 20. In the implementation of FIG. 3C, the failover appliance is operationally and electronically coupled to first 4A and second 4B hardline routers serving as the primary and failover internet connections, respectively. It is understood that in certain implementations, the firewall 5 can be induced to failover based on assessing the connection at a specific local address based on port number. As one illustrative embodiment, if a packet routed to an address 1.1.1.10 responds to the system via a secondary port—for example 222—the system 10 will identify this as a network failure and the system 10 will failover to a secondary or tertiary connection. If it stops responding then switch back to a primary connection.

In implementations with multiple interfaces 50, 52 and connections 3, 24, each interface/connection pair can be a default gateway, in that either interface 50, 52 can act as the primary default gateway as required.

For example, in various implementations, in the absence of alternate or local routing instructions, packets (shown generally by reference arrows P) sent to and from the terminals 7A, 7B and/or the internet 8 are routed through the primary default gateway. In one example, the wired internet connection 3 may have a default gateway IP of 5.5.5.5 while the wireless internet connection 24 may have a default gateway IP of 6.6.6.6. In this implementation, during normal operation, the firewall 5 is configured to send all non-local traffic to 5.5.5.5, thereby routing it out by way of the primary connection 3. In this example, when the system 10 determines that the primary connection 3 has failed or is otherwise unavailable, the system defaults over to the failover appliance 20 to route all traffic to 6.6.6.6 and out the wireless connection 24.

Various aspects of the system 10 can serve as a policy routing enforcement system. To achieve policy routing, it is understood that these packets P can also contain, in part, a routing table 60 that can dictate packet routing. That is, in certain implementations the packets P contain source IP and destination IP address information which is then evaluated via a router by analyzing the routing table to dictate if the traffic will be routed locally or routed to the internet. It is further understood that individual addresses can be resolved at discrete IP addresses. That is, the system 10 is able utilize various IP addresses to direct traffic through a specific gateway/interface/connection to be received at a corresponding address to validate the specific connection.

For example, in one illustrative implementation, the system can be configured for policy routing, such that for packets issued by the probe 30:

a.website.com resolves by DNS to an IP address of 1.2.3.4
b.website.com resolves by DNS to an IP address of 1.2.3.5

Accordingly, in this implementation, the probe 30 can be configured to issue routed packets and correspondingly the firewall 5 can be configured to enforce policy routing according to Rules applied to the policy routing component (which can be a firewall, router, or other device configured to dictate policy routing).

In yet another example, the following rules are given:

Rule 1: route 1.2.3.5/32 6.6.6.6 signals to the firewall 5 that any packet sent to b.website.com, should be sent out the second gateway interface 52 to the failover internet connection 24; and Rule 2: route 0.0.0.0/0 5.5.5.5 signals to the firewall 5 to send all packets out via the primary connection 3.

Accordingly, as would be understood, in this implementation, when packets arrive at the firewall 5, the firewall 5 evaluates the rules in order, such that if the conditions of rule 1 are not met, rule 2 will be executed, sending the packet via the primary connection 3. As rule 1 is specific to one destination (1.2.3.5), it creates a "pinhole" through which only traffic to that host (1.2.3.5) will flow across our backup connection 24 during normal operation, while all other packets arriving at the firewall 5 will not match the limited rule 1, and will then be routed according to rule 2, thus sending the packet via the primary connection 3.

It is understood that such policy routing can be expanded to encompass n connections. For example:

Rule 1: route 1.2.3.5/32 6.6.6.6 signals to the firewall 5 that any packet sent to b.website.com, should be sent out the second gateway interface 52 to the failover internet connection 24; and Rule 2: route 1.2.3.6/32 7.7.7.7 signals to the firewall 5 that any packet sent to b.website.com, should be sent out a third gateway interface (not shown) via a tertiary connection (not shown); and Rule 3: route 0.0.0.0/0 5.5.5.5 signals to the firewall 5 to send all packets out via the primary connection 3.

In various implementations, any number of connections and rules are possible, as would be readily appreciated by a skilled artisan.

By utilizing such rules, the validation system 10 can utilize the probe 30 to send test packets (shown by reference arrows A and B in FIGS. 3A-4E) to cloud servers 40 running an API. In these implementations, because the packets A, B are addressed and routed to specific targets 60A, 60B, the system 10 can specify the path to the internet 8, thereby determining whether the specific packet A, B will exit through a specific interface 50, 52 and therefore the corresponding primary connection 3 or secondary connection 24. In these implementations, the system 10 is configured such that the primary connection 3 and interface 50 are configured to operate as the normal default gateway, with the second interface 52 and wireless connection 24 acting as the failover default gateway. In turn, because these routes can be determined, and packets routed via different routes can be received at distinct cloud hosts, it is possible to validate each of the connections discretely.

In these implementations, the packets A, B can therefore contain specific IP addresses resolved differently on the cloud or other database 40 server—be they on the same host or multiple hosts—such that the packets are received in the same database on the cloud 40 with sufficient information for the cloud server to establish which connection 3, 24 the packet was routed through.

In accordance with these implementations, the server/database 40 is correspondingly configured to run a module or specific code to correlate the receipt of these packets A, B to validate that either or both connections 3, 24 are "up" or "down." That is, the packets A, B contain source IP address information that are received and/or resolved by different API endpoints on different domains or subdomains or server IP addresses. The receipt of any packet A, B destined for a specific endpoint—such as an IP address/domain/sub-domain—that is received at an alternate endpoint API can thus be correlated as a "down" event or even in some cases used to detect router misconfigurations for incorrect policy-based routing rules. Correspondingly, the local system 1 can be configured to switch-over traffic via the various interfaces 50, 52 as appropriate.

Further, when these packets A, B are received on the cloud 40 server in these implementations, the tags allow the database 40 to establish the destination address the packets A, B were sent to, as well as the source address they were delivered from. This information is then used to determine if a packet sent for example to 1.2.3.4, and should have egressed via the 5.5.5.5 network, egressed via the 6.6.6.6 network. This is critically important because it allows the determination of failover connection 24 status. It is also important because there are several conditions which can cause a firewall (acting as a failover device) to mark a primary connection 50 as failed, and begin routing traffic over a failover connection interface 52 even though a primary connection 3 and interface 50 may be active.

It is understood that in certain implementations, the firewall 5 can be induced to failover based on assessing the connection at a specific local address based on port number. As one illustrative embodiment, if a packet routed to an address 1.1.1.10 responds to the system via a secondary port—for example 222—the system 10 will identify this as a network failure and the system 10 will failover to a secondary or tertiary connection. If it stops responding then switch back to a primary connection.

By enforcing policy routing, the failover system 10 and probe 30 can perform a variety of operations. The system 10 can provide link-state information for multiple Internet connections which are connected to a location and provide failover state information. In certain implementations, the system 10 can also calculate performance statistics; up-time, down-time, time in failover, latency, congestion and other factors. In certain implementations, the system 10 provides a dashboard 26 that in certain implementations provides a "single pane of glass" view of all locations for an enterprise, such that an IT manager or other professional can prioritize repairs and monitor connection usage. As would be appreciated by one of skill in the art, in certain implementations, the data collection and machine learning/artificial intelligence approaches to pattern recognition can be utilized so as to add predictive aspects to the dashboard interface for end users.

Various views of the dashboard 26 are shown in FIGS. 5A-5D, whereby the dashboard 26 may be viewed on a terminal 7 and/or mobile device 28 via known graphical user interfaces. As was discussed above, certain implementations also provide intelligent alerts—such as push alerts, emails, texts or the like—that are sent to relevant stakeholders, notifying them that a local network is in failover. Certain implementations of the dashboard 26 can run on or be accessed through iOS and Android Apps for smartphones, as well as via an API framework. Alerts can be consolidated or bundled based on user settings, such that a user can select when and how many notifications may be received. Further, various implementations provide proactive testing and validation of failover connections, while they are not in active use, to validate that they are connected and ready for traffic if a primary connection fails. Certain implementations can also monitor ARP requests on the LAN 6 to "see" the devices are connected to the network and provide intrusion detection information which could be reported.

As discussed herein above, in certain implementations, when the system identifies an outage or other need to failover, be it at the server 40 level, probe 30 level, or by a user, the local network 1 can be commanded to failover to an alternate WAN connection. It is understood that certain detected disruptions will fully prevent direct communication via a down connection between the probe 30 and the server 40. In the these implementations, the server 40 and/or probe 30 may quantitatively or qualitatively realize a signal interruption. In the case of a cloud server, the server 40 or probe 30 (and any associated systems and components) can apply logic accordingly (down, traffic coming out of the primary WAN that should have come from secondary WAN, and the like).

In implementations where an interruption is identified at the server 40 level, the system 10 is able to communicate back to the probe 30 or other local components via a variety of network-level electronic communication I/O (input/output), such as polling, as one in the art would appreciate. That is, in certain implementations a "signal" can be dispatched from the server 40 to the probe 30 to induce a failover. Many methods for this polling or other communication are possible, such as via representational state transfer ("REST"), Simple Object Access Protocol ("SOAP"), Web Services Description Language ("WSDL"), WebSockets, an SSH tunnel (or other secure channel), or other custom protocols built on top of TCP, UDP or the like traffic.

Figure 6A:
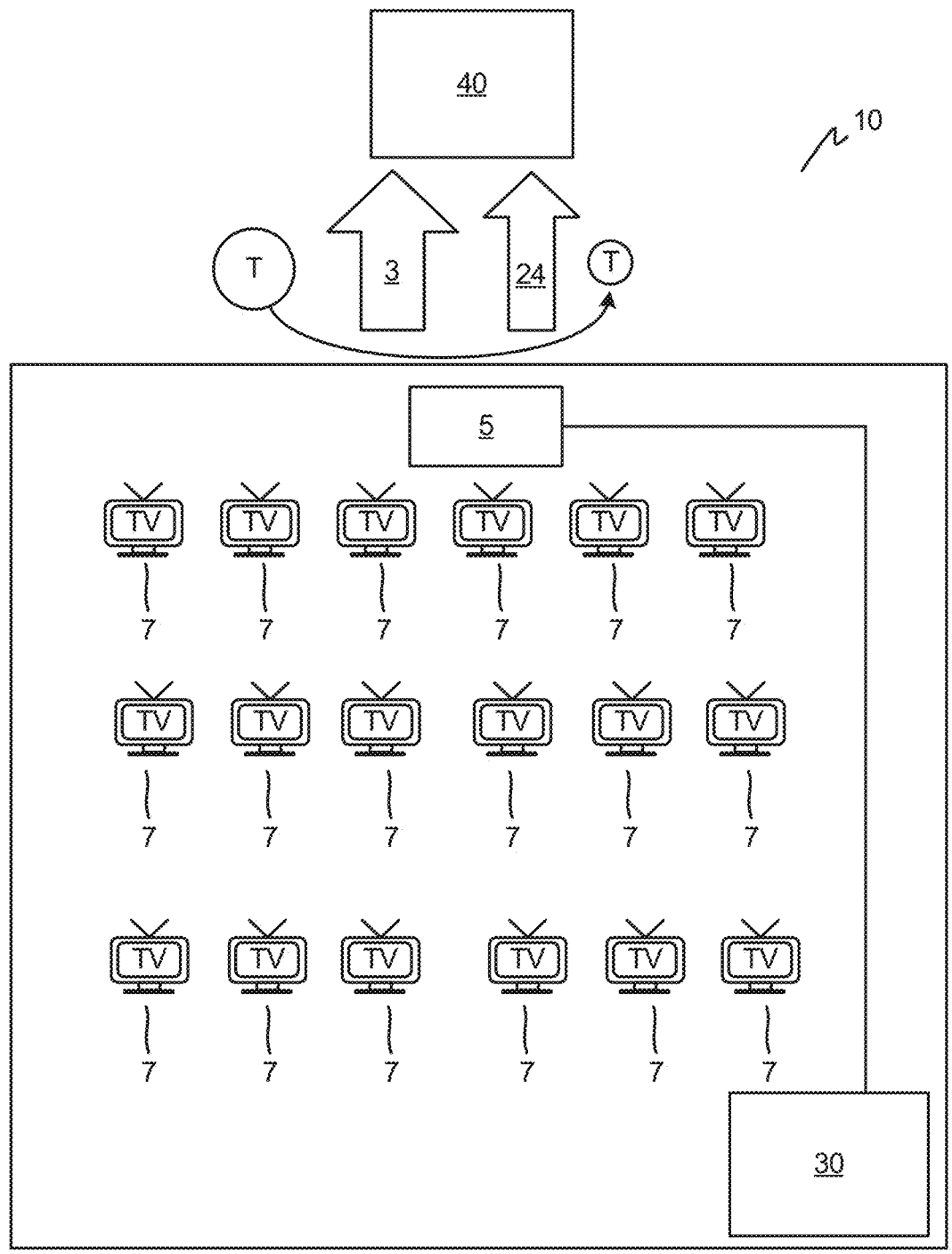
FIG. 6A is a schematic showing a local network having several terminals, several connections and a probe, wherein the system utilizes rules to load balance.
Figure 6B:
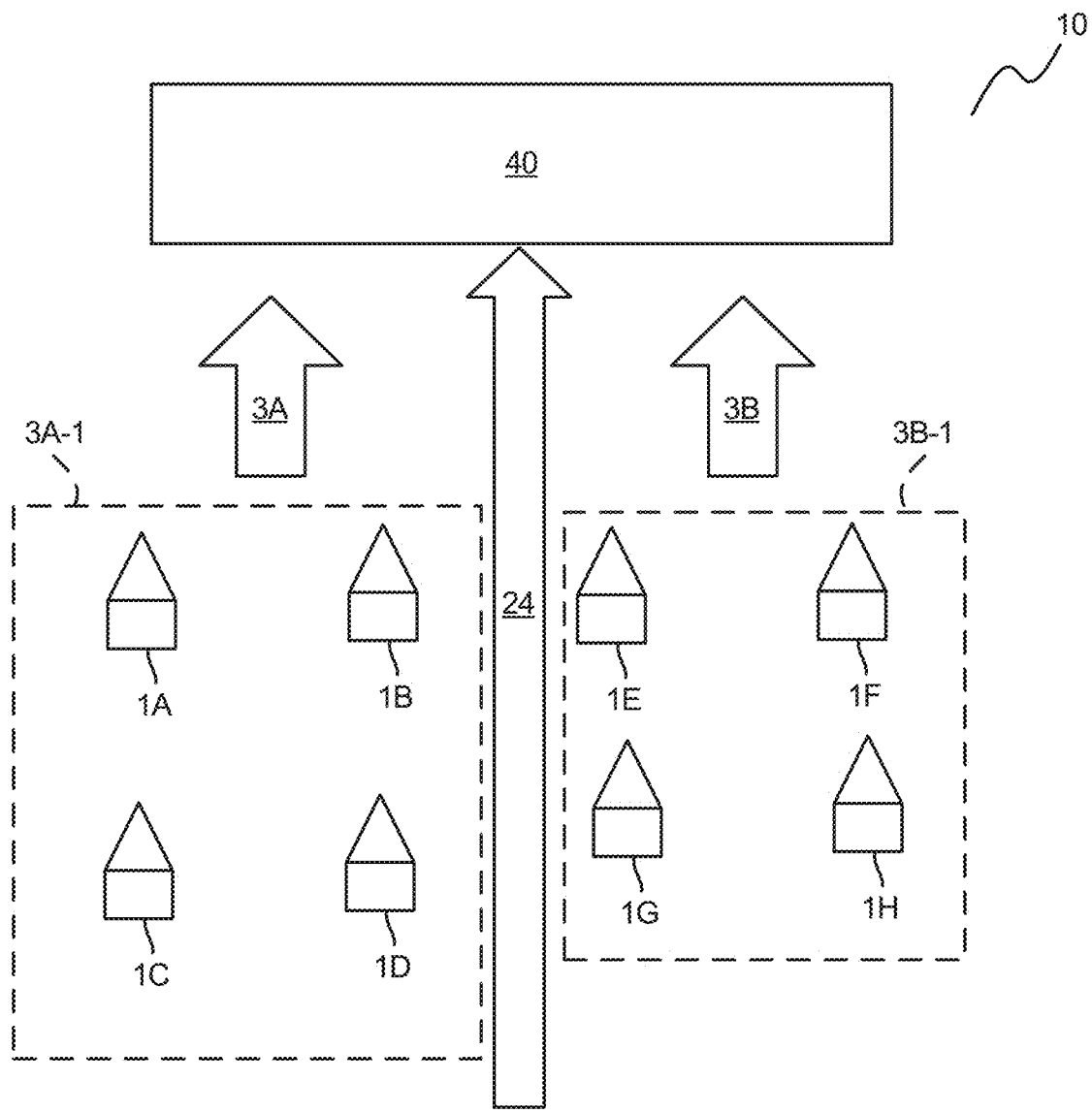
FIG. 6B is a schematic showing several discrete networks sending test packets to a cloud server, according to one implementation.
Figure 6C:
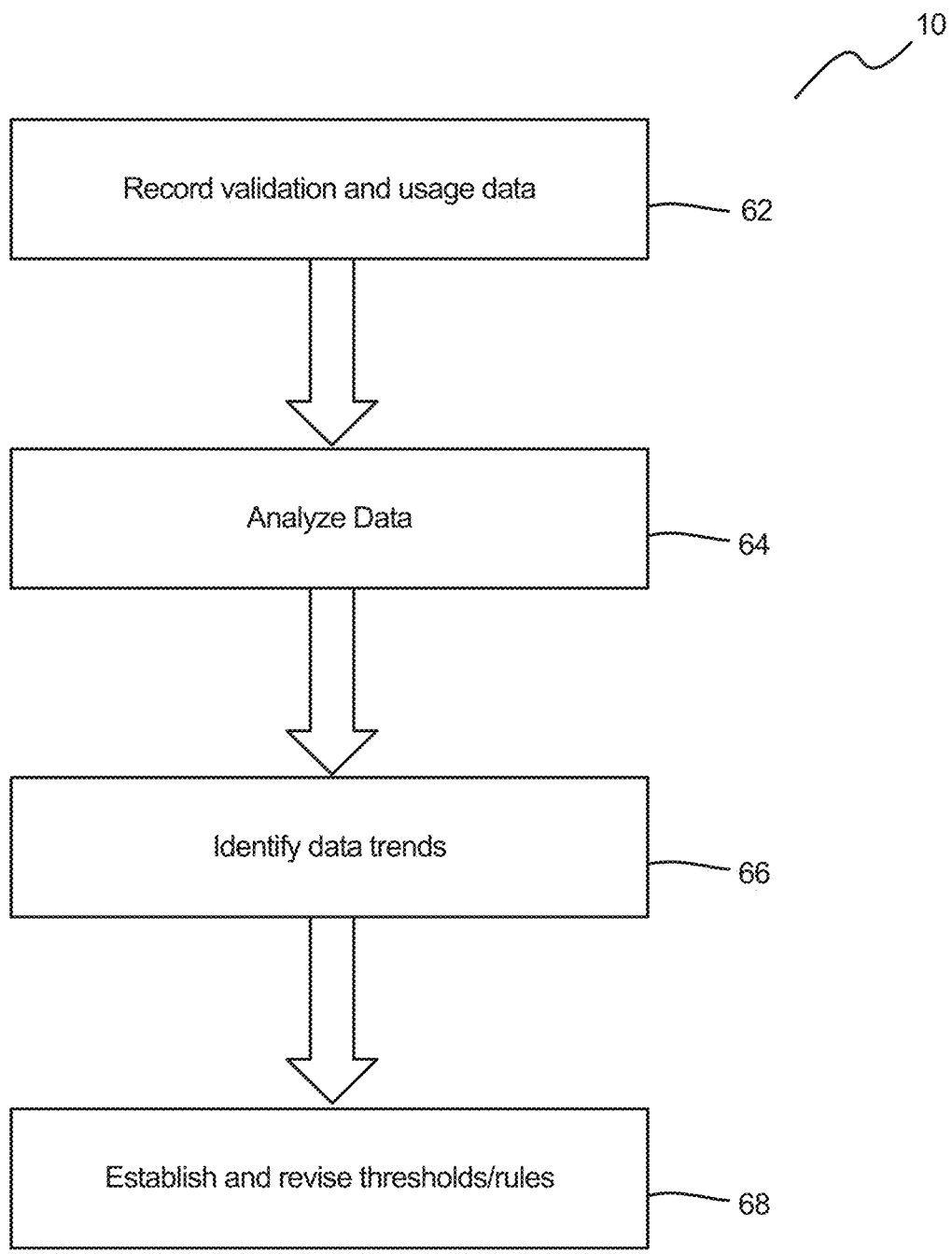
FIG. 6C is a flow chart showing one possible implementation of system optimization.

Several additional applications and implementations of the system 10 operating at the cloud or external server 40 level are depicted in FIGS. 6A-6C. In these implementations, the monitoring of signals from several individual networks at a remote server 40 improve overall system performance and provide additional benefits to the end user. It is further understood that in each of the discussed system implementations, the probe 30 is in operational communication with the server 40 and enforcing policy routing, discussed above, so as to enable connection monitoring and validation.

In accordance with some implementations, certain quality of service ("QoS") or other traffic shaping, splitting, and classification and applied routing or load balancing connection switching can be achieved, which may be referred to herein as traffic classification and routing policies. In these implementations, network traffic (shown with reference arrow T) is classified routed through various connections 3, 24 based on specified rules that can be turned on or off, or selectively applied based on end user preference and/or algorithm. For example, in accordance with certain implementations, the system 10 has traffic classification and routing policies that evaluate one or more parameters, such as latency, application filtering, port filtering and/or other systems and methods of traffic classification that would be apparent to one of skill in the art.

In these implementations, QoS is achieved for the betterment of the local network, such that some traffic can be selectively routed out of one WAN 3 connection or another WAN connection 24, but the terminal user experience is simply online: unaware of the routing and/or networking taking place between the connections 3, 24. In certain business network implementations, the application traffic classification and routing policies are active or applied could be partially or wholly determined or controlled with the probe 30 and cloud 40 logic and evaluation combination. One of skill in the art would appreciate various alternative configurations that are possible. In various implementations, the probe 30 can therefore trigger the application of or disablement of business rules for QoS, load balancing for WAN and other procedures in real or near real-time, instead of the probe 30 only triggering failover.

One representative example occurs in a commercial setting is shown in FIG. 6A, where the local network 1 is in a hotel having many terminals 7, which in this exemplary implementation are televisions 7 connected to a streaming video service. In this example, it is understood that network or bandwidth utilization goes up during certain time windows, such as in the evening when many terminals 7 are downloading video. In the event that the primary connection 3 is a cable/DSL/fiber connection and the backup or failover connection 24 is an unlimited satellite plan, the failover connection is frequently idle while the primary connection is being saturated with network traffic. In this example, if a spike in primary network 3 utilization is detected, such as a congestion event at a certain time—for example related to the evening surge in video streaming, such as Netflix®—the probe 30 in certain implementations is able to evaluate and signal or send to the cloud 40 to evaluate application traffic classification and routing policies, receive a response, and signal the firewall to load balance some of that traffic between the connection 3, 24 (shown at reference arrow T). The resulting load balancing creates lowered network congestion, and a better experience for customers—triggered by the probe 30 and/or cloud 40.

Similarly, in certain implementations, as shown in FIG. 6B, the system 10 at the cloud 40 level can identify wider trends in congestion disruption and use that information to disseminate failover instructions or guidance to alternate, similarly situated networks and/or locations. That is, in one illustrative example, if many discrete local networks 1A, 1B, 1C, 1D, 1E, 1F, 1G, 1H—for example residences in a neighborhood or businesses in a commercial area—are operating in, on, or through an aggregation of similar connection or connections 3A, 3B, 24—for example a single internet service provider having one or more WAN 3A-1, 3B-1 or internet connections 3A, 3B—the server 40 and system 10 can be configured to gather data and statistical performance metrics about the network performance at the discrete networks 1A, 1B, 1C, 1D, 1E, 1F, 1G, 1H and connections 3A, 3B, 24 for use in informing and predicting network interruptions across the set of local networks 1A, 1B, 1C, 1D, 1E, 1F, 1G, 1H. It is understood that such identification approaches enable actions to be undertaken in either an automated or a manual fashion to improve the quality of in evaluation of discrete network 1A, 1B, 1C, 1D, 1E, 1F, 1G, 1H connections to the internet. As would be appreciated by one of skill in the art, in certain implementations, on the basis of connection monitoring and validation from a first connection 3A, it may be possible to interpret and apply traffic classification and routing policies that evaluate one or more parameters to route and re-route traffic.

As shown in FIG. 6C, in accordance with various implementations, the system 10 is able to record data (box 62) related to many individual network connections at the server 40 level, and then perform statistical analysis (box 64) on the recorded data to evaluate distributions in the recorded data and improve overall system performance. It is understood that in these implementations, by integrating statistical analysis of connection health over time, such as the standard deviation, into the system, it is possible to identify system trends (box 66) and separate normal functions from statistically anomalous connections or issues to establish and revise failover thresholds (box 68). It is understood that in certain implementations, the system 10 utilizes pattern recognition, artificial intelligence, neural net technology, and/or machine learning to establish performance thresholds and predict system outages, and/or "load balance," as described below. Additional implementations also monitor additional parameters such as carrier frequency, oscillation and indicia of network performance for the application of statistical analysis, machine-learning and the like.

By way of example, in exemplary implementations, the system 10 can monitor actual web page load times for several websites and generate the mean load time, the standard deviation and variance (square root of the standard deviation). In these implementations, the system 10 can thereby identify user locations which can be compared with thresholds to establish the strength of individual connections (for example "great," "normal," or "bad"). It is further appreciated that these given thresholds can be established and revised on an ongoing basis via the examination of the recorded data and can integrate statistical modeling. For example, an end user would be able to compare their connection strength with other comparable users' connection strength, i.e. "How does my hotel's internet speed compare to all my other hotels internet speed, compared to lots of other hotels internet speed across the country?" By way of a further example, after the system 10 via the server 40 has identified a widespread service outage on an ISP, the system can be configured to apply logic to preemptively failover potentially vulnerable locations to avoid service interruptions prior to otherwise being detected discretely. These implementations can also allow for end users to avoid the so-called "last mile" or common/shared infrastructure challenges, such as when several ISPs use the same fiber optic network, the system 10 can be configured to map and otherwise recognize more complex connection outages and initiate failover rules at several end networks 1.

Figure 7A:
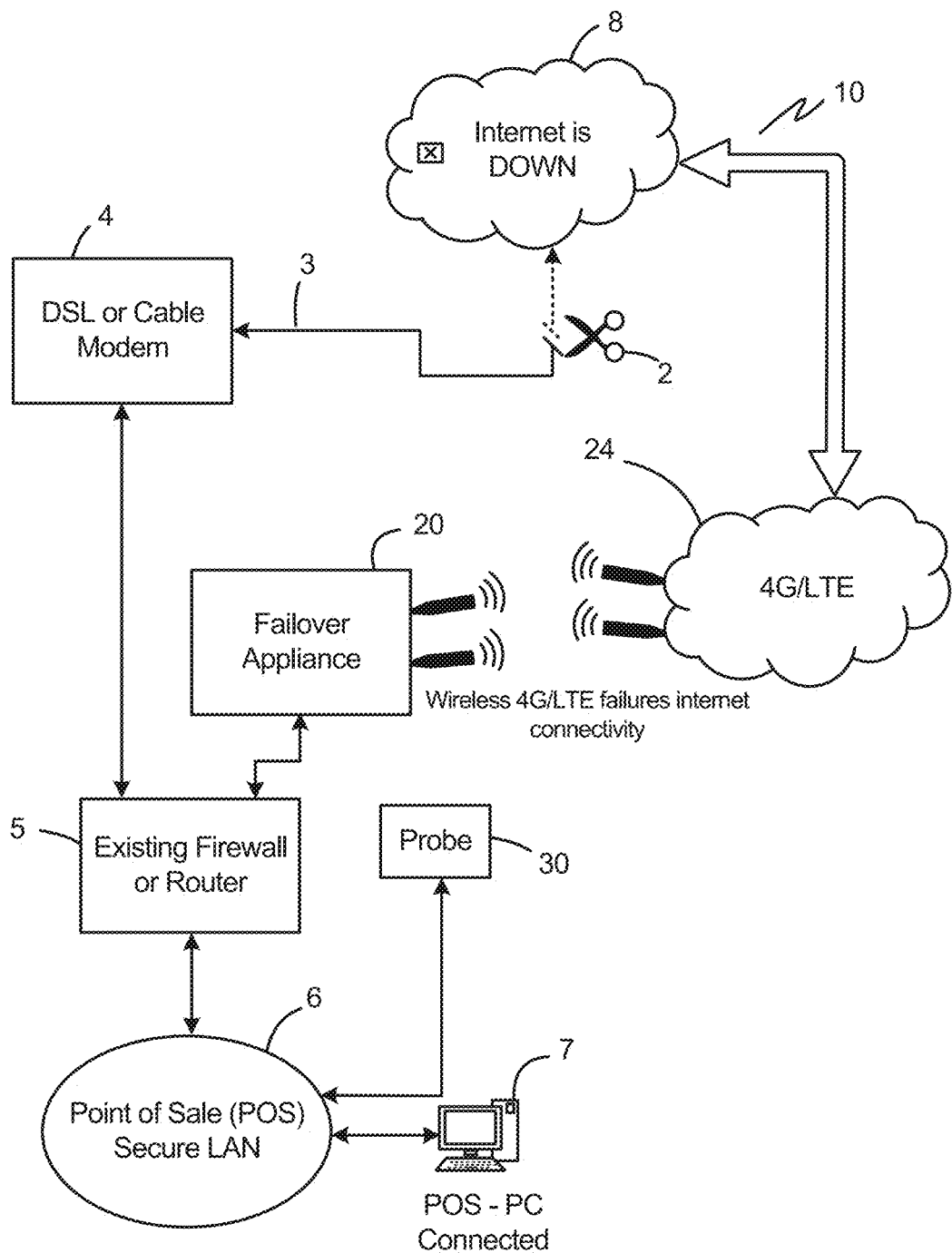
FIG. 7A is a schematic depiction of a typical local network connected to the internet and comprising several internet connections including a validation probe installed into the LAN, according to an exemplary implementation.

As shown in FIG. 7A, in exemplary implementations, the system 10 can be configured such that the failover appliance 20 is integrated with an existing firewall or router 5, and the probe 30 can be in direct communication with the LAN 6, rather than directly installed to the firewall 5. For example, the probe may be directly installed into a terminal 7 on the LAN 6, or otherwise integrated, such as implementations where the probe is not a physical device, but rather software, firmware or some other form of module installed or otherwise operating within the LAN 6.

Figure 7B:
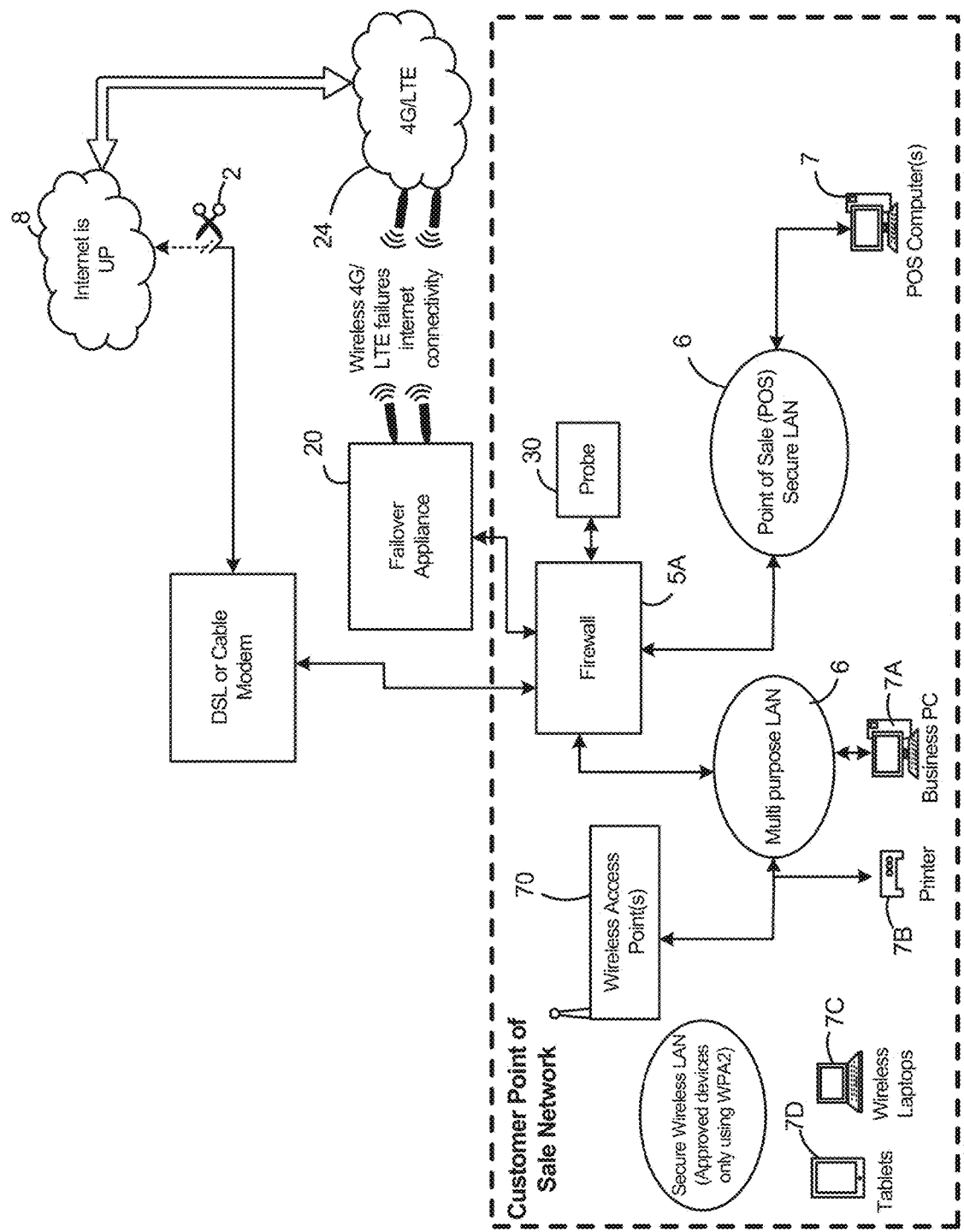
FIG. 7B depicts a schematic of yet another implementation, wherein an integrated firewall is provided, according to one implementation.

FIG. 7B depicts yet another implementation, wherein an integrated firewall 5A is provided. In various of these implementations, the integrated firewall 5A is fully managed, to control the configurations of the failover appliance 20 and/or probe 30, both of which may be physically integrated into the firewall 5A as discussed above.

Figure 7C:
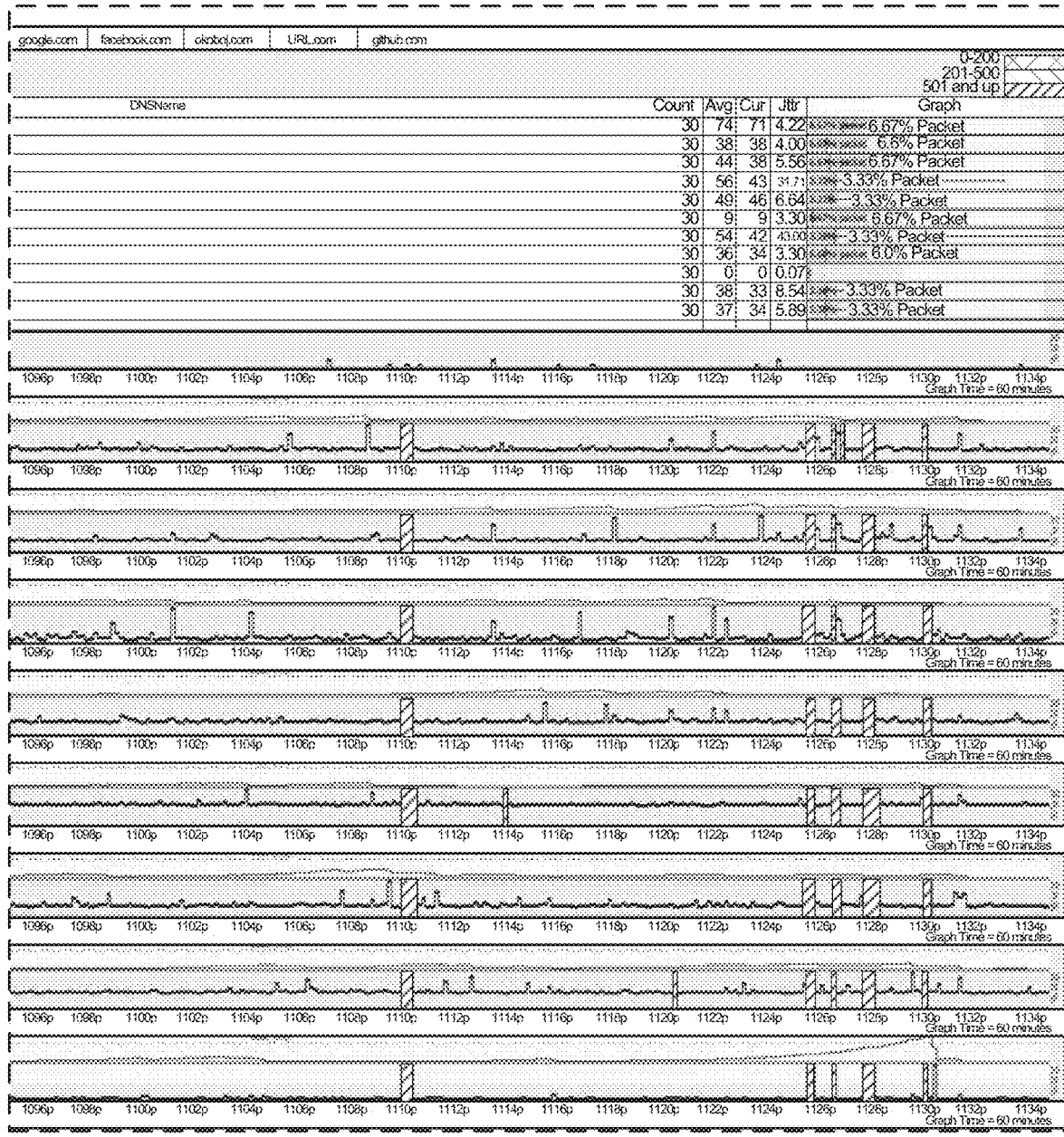
FIG. 7C shows a time sequence of network, demonstrating that it is possible for the various implementations to detect connection interruptions on the order of a few seconds.

As shown in FIG. 7C, it is possible for the various implementations to detect connection interruptions on the order of a few seconds (shown by cross-hatching). These interruptions of about 10-20 seconds may not persist long enough to trigger failover, but may be noticed by end-users on the LAN. Accordingly, in certain embodiments, the use of the disclosed system of policy routing and cloud-based, on-site or appliance detection allows for the implementation of time threshold rules, wherein short interruptions of network traffic can automatically induce failover for the brief periods of downtime. Such that, and as explained further above, if packets are sent every second and two packets are missed, calculating in resistance, after 2:17 a connection may be deemed down and failover induced. In these implementations, when the server detects that the primary connection has been re-validated, the system and API can be configured to automatically failback to the primary connection, thereby providing seamless transitions between the connections and an uninterrupted network experience.

Figure 8B:
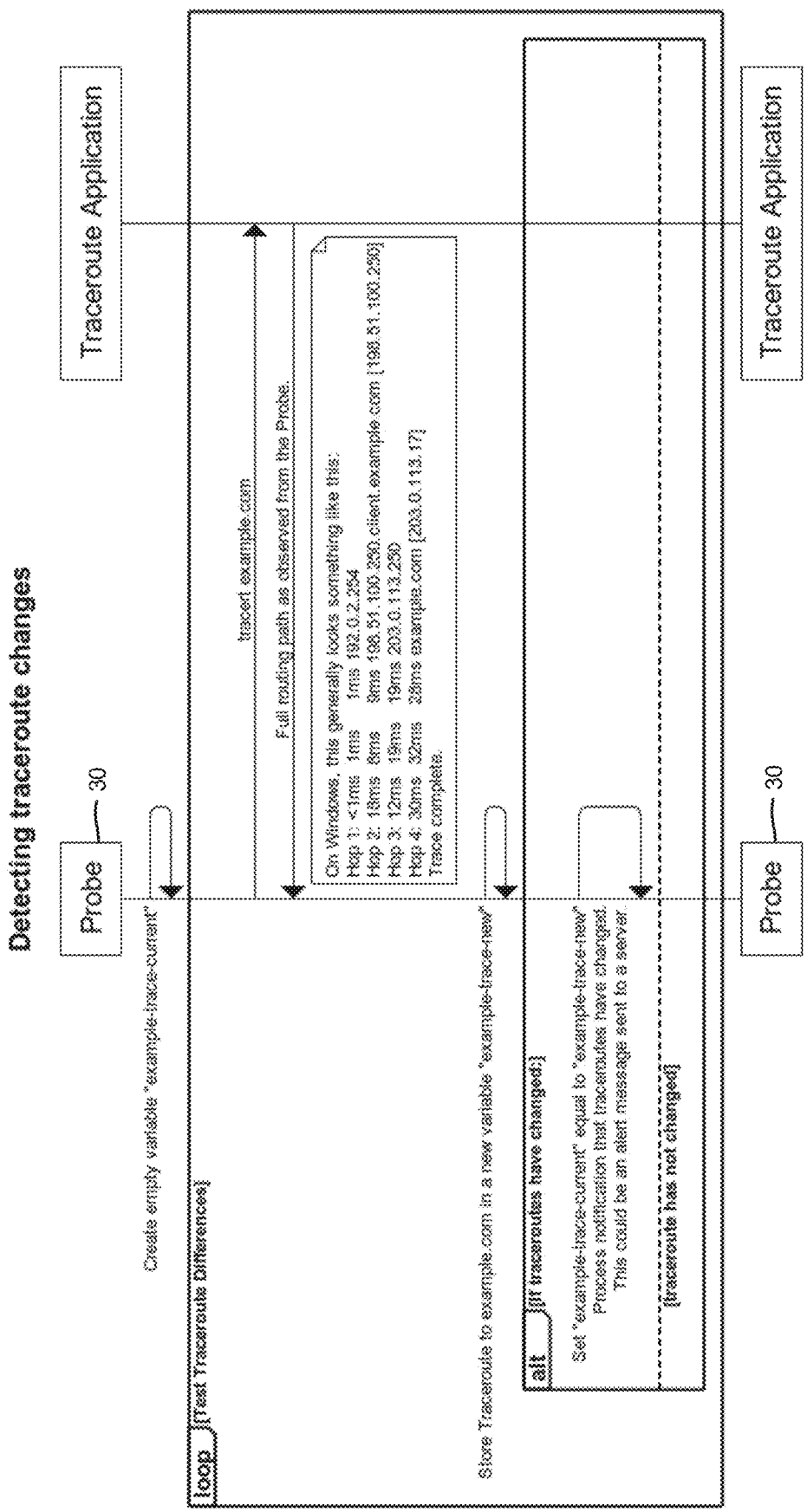
FIG. 8B is a schematic showing traceroute detection on a network.

In certain implementations of the system 10, congestion can be detected using a summing approach 70, one implementation being shown generally in FIGS. 8A-8B. In these implementations, the system 10 utilizes several non-limiting steps to identify congestion and network problems. A further explanation of these steps follows. It is understood that it is difficult to detect the junction between the local area network and ISP network, but several assumptions can be made that are generally true in most network environments. First, although network connections vary, it is very unlikely that more than 5 "hops" are present before the ISP gateway. Second, packet loss occurring within a LAN network is typically negligible. Third, it is possible to correlate the congestion of the network by monitoring ping times and packet loss to each hop.

Returning to the system 10 as shown in FIG. 8A-8B, in various implementations, one step is to analyze the routing path to multiple diverse targets to determine the last common hop (box 72) within the ISP to establish the data path.

As also shown in FIG. 8A-8B, in another step, the system 10 examines the data link by route tracing (box 74) utilizing a route tracing tool, such as traceroute and ICMP (ping) testing, including the Linux MTR tool, Windows Pathping or other similar technologies. In various implementations, the trace is performed by running an MTR or other route trace to a distant internet target that is consistently up, for example 8.8.8.8. Various implementations include additional versions of this network testing system, thereby encompassing ICMP/traceroute testing, aggregated load time testing across different internet targets (such as websites), correlated downtime events, correlated location testing wherein test data is aggregated from multiple customer sites, and the like. A skilled artisan would appreciate the various approaches contemplated herein.

FIGS. 8A and 8B also show that in a third step, having established the last common hop (box 72) and by performing route tracing (box 74) the latency and packet loss along the route for a defined number of hops can be summed (box 76) to determine the latency and thereby monitor system 10 congestion. As part of the summing step, the packet loss for the first finite number of hops is established. In a healthy connection, packet loss for hops that are good will be near-zero and irrelevant. As was explained above, the summed latency and packet loss values for the finite hops can be observed intermittently. It is further appreciated that the resultant data can be used variously, as would be appreciated. A more thorough explanation with several examples follows.

Figure 9A:
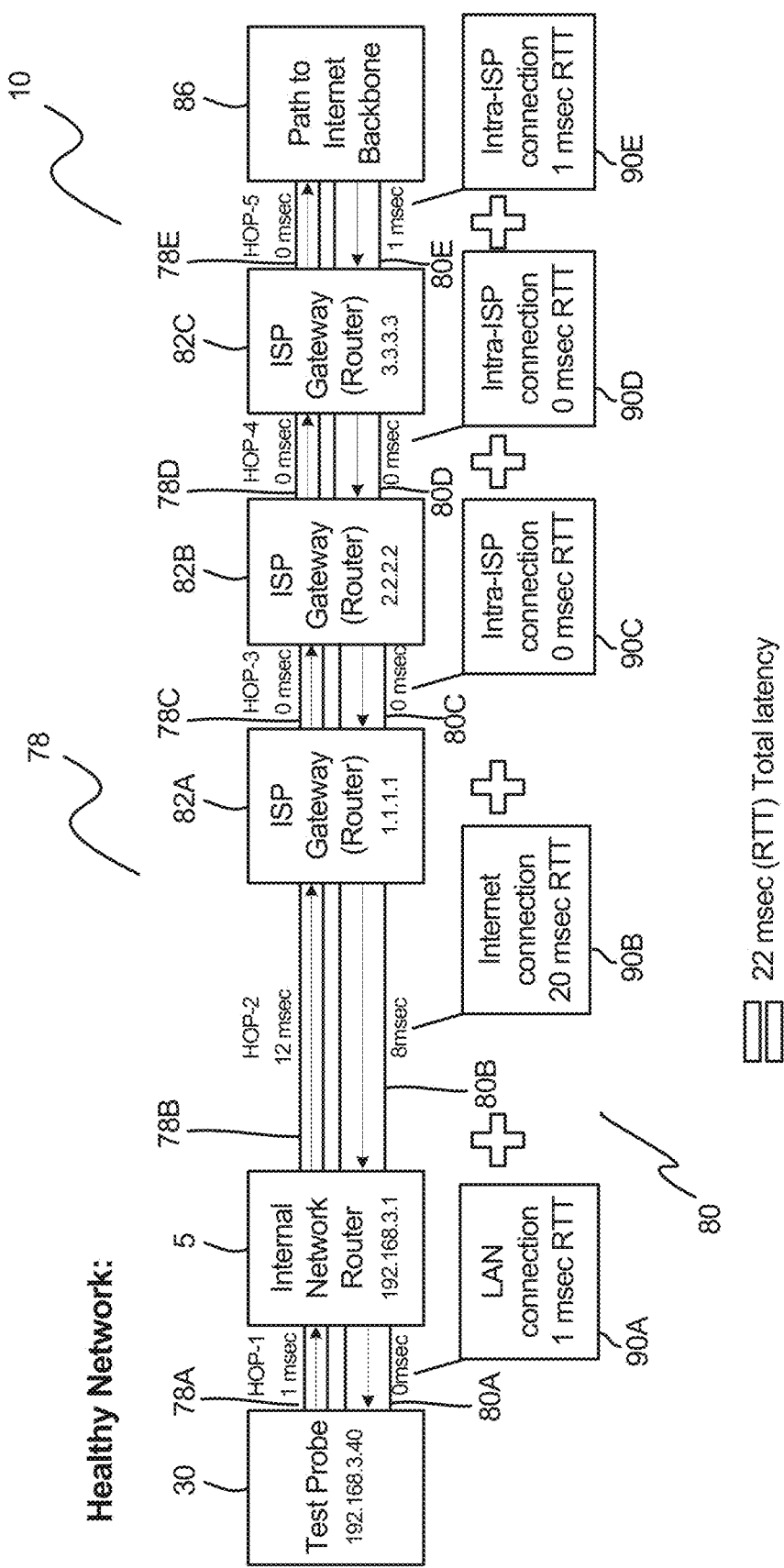
FIG. 9A shows a schematic of the latency between hops on a healthy network.

An exemplary healthy, or non-congested internet connection is shown in FIG. 9A, showing a series of uplinks 78 and downlinks 80. In this implementation, a probe 30 is deployed within the LAN 6 in communication with a router 5 via a local uplink 78A and local downlink 80A connection. In turn, the router 5 has up 78B and down 80B connections to an ISP gateway 82A. In this implementation, several gateways 82A, 82B, 82C are in up 78C, 78D, 78E and down 80C, 80D, 80E communication with one another before reaching the internet backbone 86.

Accordingly, the uplink and/or downlink connection latencies 90A, 90B, 90C, 90D, 90E between these hops (shown generally at 78 and 80) can be summed (as shown in FIG. 8 at box 76) in establishing the route (box 74) and latency (box 72). It is understood that in a healthy network, the final sum for the first five hops would typically be in the range of 10 to 50 msecs, with packet loss percentages of less than 5%. It is further understood that in alternate configurations, other numbers of hops can be used, such as 4 or fewer or 6 or more.

Figure 9B:
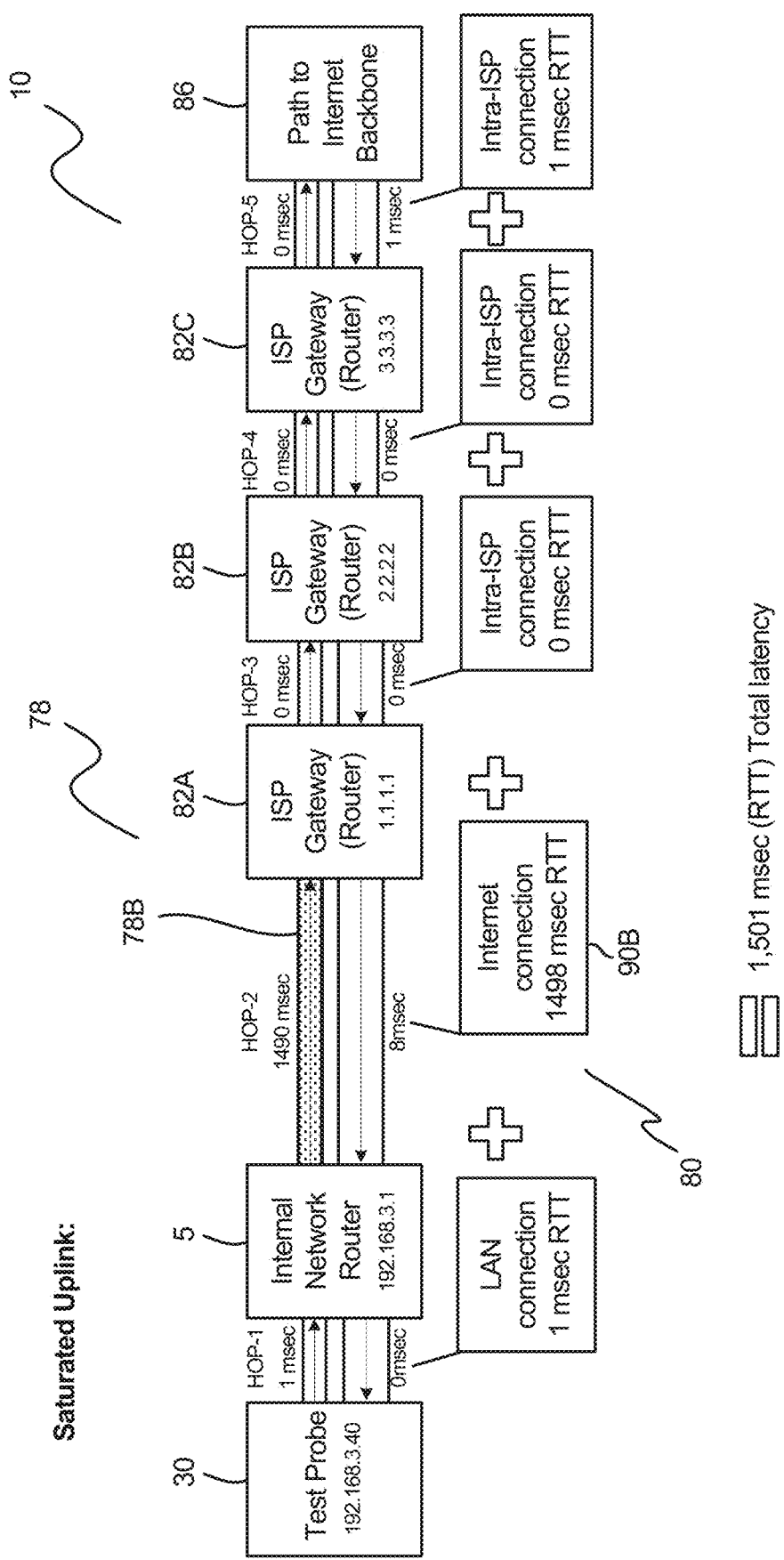
FIG. 9B shows a schematic of the latency between hops on a network with a saturated uplink.
Figure 9C:
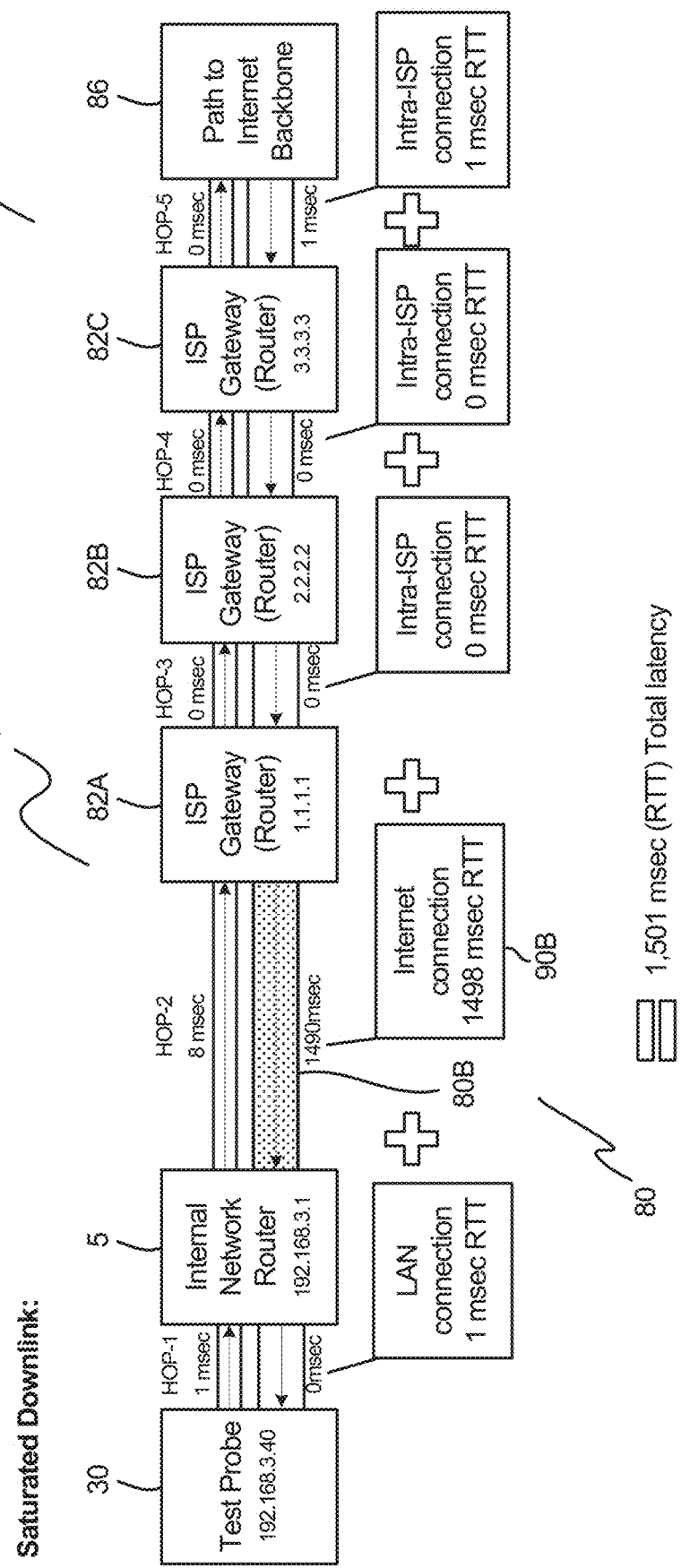
FIG. 9C shows a schematic of the latency between hops on a network with a saturated uplink.

FIG. 9B depicts an implementation of the system 10 wherein the uplink is saturated at a specific connection 78B. Accordingly, the latency 90B of that uplink connection 78B is orders of magnitude higher than would be observed in the implementation of FIG. 9B. Accordingly, the total latency (box 76) will increase dramatically, and packet loss will increase. FIG. 9C depicts a saturated downlink 80B connection. Again, this saturation will increase the download latency 90B, causing delays and packet loss.

Figure 10A:
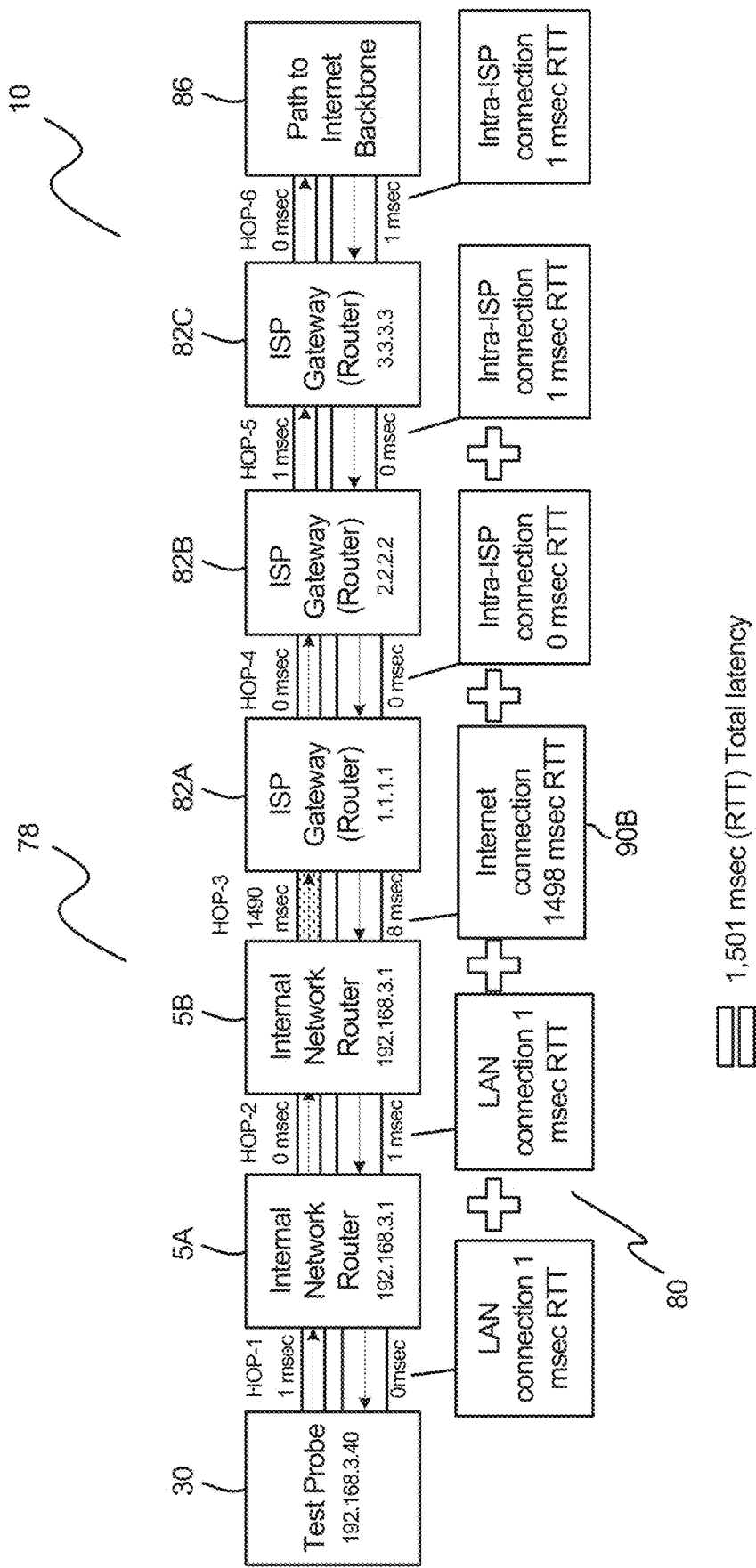
FIG. 10A shows a schematic of the latency between hops, according to a further implementation of the system utilizing the summing approach.
Figure 10B:
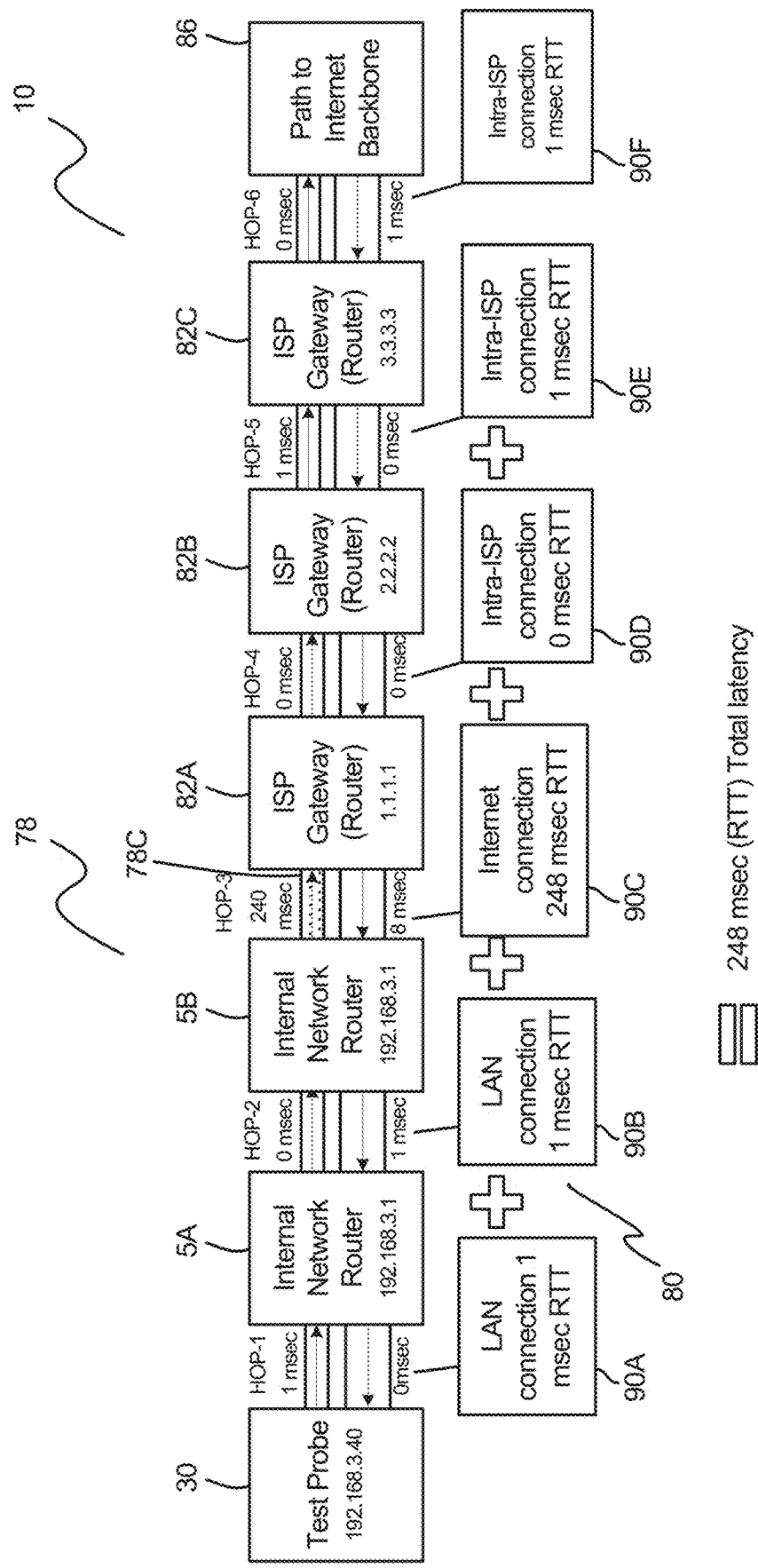
FIG. 10B is a further schematic of the latency between hops, according to a further implementation of the system utilizing the summing approach.

As shown in FIGS. 10A-10B, it is important to understand that these steps are being performed for a limited number of hops, such as 4, 5 or 6. As shown in FIG. 10A, when the network topology varies, it does not affect the ability to detect or identify network congestion. In FIG. 10A, two internal routers 5A, 5B are provided. It is still possible to trace and sum the first five or six connections 90A, 90B, 90C, 90D, 90E and/or 90F. As would be appreciated, despite the existence of an additional router 5B, the sum of the latency and losses within the network are still less than the latency of any saturated link, thereby establishing that there is congestion within the first five or six measured hops (the given finite number). As shown in FIG. 10B, when a saturation or semi-saturation event occurs (here at 78C), partial or full congestion will be recognized on the network by summing the defined number of hops 90A, 90B, 90C, 90D, 90E and a determination about whether to failover can be defined, such as based on a latency/loss threshold.

It is understood that by summing the latency over a finite number of hops (as shown by 90A, 90B, 90C, 90D, 90E), it is irrelevant if the internet connection is the first, second, third or other hop, because the Internet connection delay will be captured on one of these early hops. The delay for other hops is usually inconsequential (a few milliseconds) and is typically far less than the latency of our saturated link. By not incorporating more hops than the given finite number, the system avoids accidentally incorporating intra-ISP, or Internet backbone latency into the measurement.

Figure 11B:
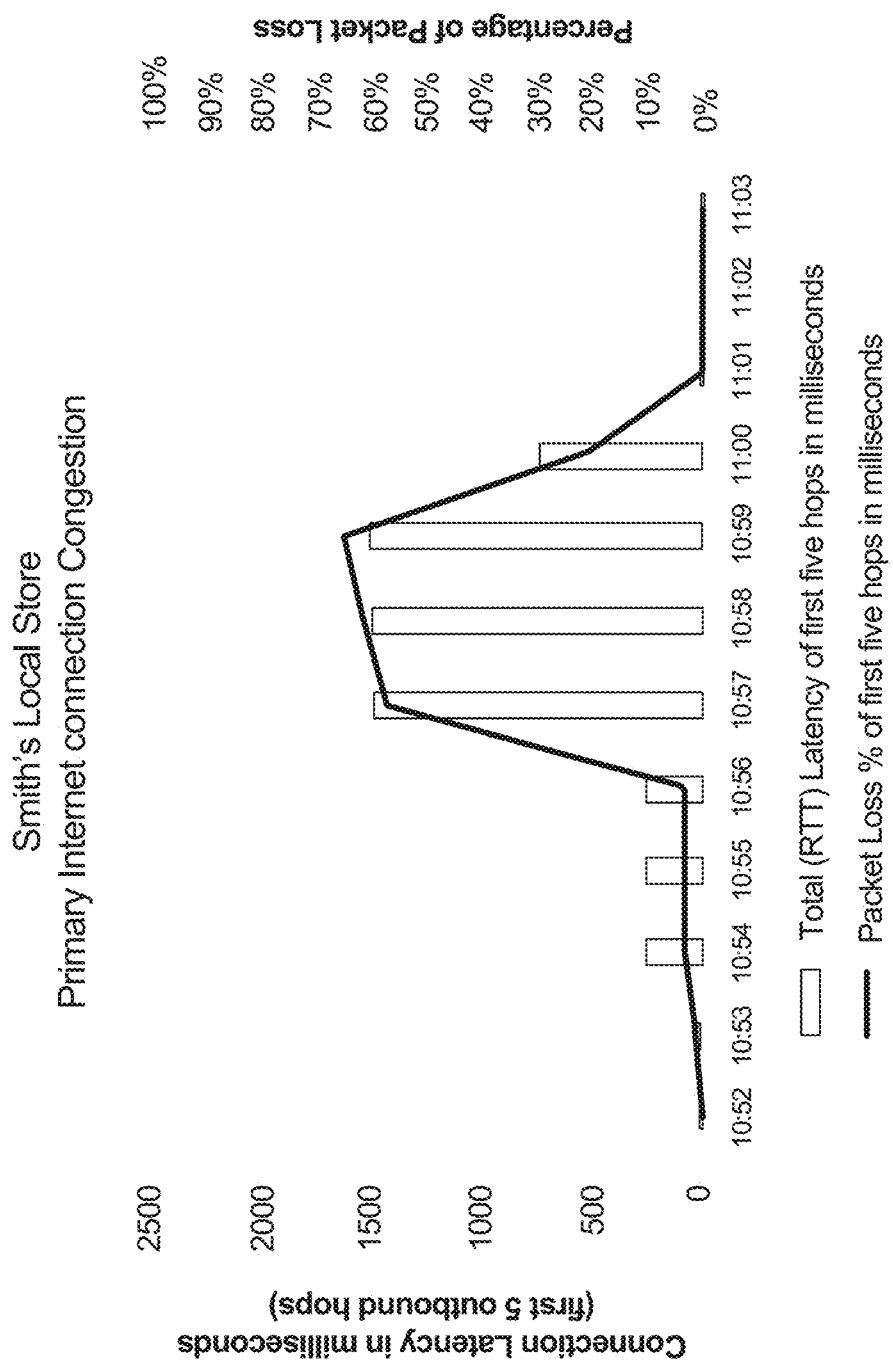
FIG. 11B is a bar graph showing the latency for a exemplary network at a series of hops.

As shown in FIGS. 11A and 11B, the latency 92 such as ping time 92 and packet loss 94 per hop can be measured and displayed for each hop. The total latency of the first number of hops (such as five, though again, other numbers of hops can be employed in alternate implementations) can be established to identify whether any congestion that is occurring is occurring locally, so as to trigger a failover event.

Although the disclosure has been described with reference to preferred embodiments, persons skilled in the art will recognize that changes may be made in form and detail without departing from the spirit and scope of the disclosed apparatus, systems and methods.

What is claimed is:

1. A failover connection monitoring and validation system, comprising:
    a. a cloud server running an API comprising a plurality of endpoints;
    b. a probe constructed and arranged to issue routed packets, each packet comprising source and destination information;
    c. a firewall constructed and arranged to enforce policy routing and comprising:
        i. a routing table;
        ii. a first network interface for a first connection; and
        iii. a second network interface for a second connection; and
    wherein:
        i. the policy routing system on the firewall is constructed and arranged to route the routed packets through the first and second network interfaces and over the first connection and second connection based upon destination information as required by the routing table for resolution to one of the endpoints on the cloud server,
        ii. the cloud server is constructed and arranged to correlate the receipt of packets from the first and second connections at various endpoints to validate the status of the first and second connections.

2. The failover connection monitoring system of claim 1, further comprising a platform adapted to gather performance data on the first and second connections simultaneously.

3. The failover connection monitoring system of claim 1, wherein the system is constructed and arranged to load balance.

4. The failover connection monitoring system of claim 1, further comprising a failover appliance.

5. The failover connection monitoring system of claim 1, wherein the probe is an installable device.

6. The failover connection monitoring system of claim 1, wherein the probe is software or firmware-based.

7. The failover connection monitoring system of claim 1, wherein the probe is in electronic communication with a firewall.

8. A LAN connection monitoring and validation system, comprising:
    a. a cloud server comprising an API;
    b. a local probe constructed and arranged to issue at least a first packet and a second packet,
        i. the first packet comprising a first condition; and
        ii. the second packet comprising a second condition;
    c. a firewall in operational communication with the local probe and cloud server;
    d. a primary connection interfacing with the firewall;
    e. a secondary connection interfacing with the firewall; and
    f. a policy routing system established on the firewall, wherein:
        i. the policy routing system is constructed and arranged to apply rules for routing the first and second packets based on the first and second conditions,
        ii. the local probe utilizes the policy routing system to route the first and second packets via the primary connection and the secondary connection for resolution at the cloud server,
        iii. the cloud server is constructed and arranged such that when the first packet is resolved to a first endpoint on the cloud server via the primary connection then the primary connection is validated, and
        iv. the cloud server is constructed and arranged such that when the second packet is resolved to a second endpoint on the cloud server via the secondary connection then the secondary connection is validated.

9. The system of claim 8, wherein the LAN is configured to failover to the secondary connection when the primary connection is interrupted.

10. The system of claim 9, wherein the LAN is configured to failback to the primary connection when connectivity is restored.

11. The system of claim 8, wherein the system is configured to assess congestion via a summing approach.

12. The system of claim 8, wherein the system is configured to balance traffic via the primary and secondary connections.

13. The system of claim 8, wherein the cloud server is configured to generate outage or service level alerts.

14. The system of claim 8, wherein the cloud server is configured to identify packet latency and induce failover.

15. The system of claim 8, wherein the cloud server is configured to record network performance data.

16. The system of claim 8, further comprising a dashboard wherein primary and secondary connection status is displayed.

17. The system of claim 8, wherein the cloud server is constructed and arranged to collect data regarding performance and utilization of the LAN.

18. A method for network connection validation comprising:
- (a) providing a network comprising:
  - (i) a firewall constructed and arranged to enforce policy routing and comprising a routing table;
  - (ii) a probe;
  - (iii) a first connection; and
  - (iv) a second connection;
- (b) providing a cloud server comprising an API and a plurality of endpoints;
- (c) issuing a plurality of packets by the probe;
- (d) routing the plurality of packets over the first connection and the second connection, as required by the routing table, to an endpoint on the server;
- (e) receiving and resolving the packets at the endpoint on the server; and
- (f) validating by the server the status of the first connection and the second connection.

19. The method of claim 18, further comprising establishing thresholds for establishing down connections.

\* \* \* \* \*